(12) United States Patent
Sun

(10) Patent No.: US 10,791,466 B2
(45) Date of Patent: Sep. 29, 2020

(54) FREQUENCY SPECTRUM MANAGEMENT DEVICE AND METHOD, ELECTRONIC DEVICE AND METHOD, AND WIRELESS COMMUNICATION SYSTEM

(71) Applicant: Chen Sun, Beijing (CN)

(72) Inventor: Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/089,712

(22) PCT Filed: Apr. 18, 2017

(86) PCT No.: PCT/CN2017/080869
§ 371 (c)(1),
(2) Date: Sep. 28, 2018

(87) PCT Pub. No.: WO2017/193770
PCT Pub. Date: Nov. 16, 2017

(65) Prior Publication Data
US 2019/0059000 A1    Feb. 21, 2019

(30) Foreign Application Priority Data

May 13, 2016 (CN) .......................... 2016 1 0319216

(51) Int. Cl.
*H04W 16/14* (2009.01)
*H04W 64/00* (2009.01)
*H04W 24/02* (2009.01)

(52) U.S. Cl.
CPC ......... *H04W 16/14* (2013.01); *H04W 64/003* (2013.01); *H04W 24/02* (2013.01)

(58) Field of Classification Search
CPC .................................................... H04W 16/14
See application file for complete search history.

(56) References Cited

U.S. PATENT DOCUMENTS

| 2012/0327835 A1* | 12/2012 | Hakola | H04W 28/16 370/312 |
| 2013/0142129 A1* | 6/2013 | Rinne | H04W 24/00 370/329 |

(Continued)

FOREIGN PATENT DOCUMENTS

| CN | 102685754 A | 9/2012 |
| CN | 103974261 A | 8/2014 |

(Continued)

OTHER PUBLICATIONS

English Translation of International Search Report and Written opinion for International Application No. PCT/CN2017/080869, dated Jul. 25, 2017.

*Primary Examiner* — San Htun
(74) *Attorney, Agent, or Firm* — Xsensus LLP

(57) ABSTRACT

A frequency spectrum management device includes a processor configured to: adjust, in response to a coexistence management request from one or more secondary system apparatuses, current grouping of the one or more secondary system apparatuses according to a predetermined performance requirement, wherein the coexistence management request comprises at least information about available spectrum resources requested from a geographic location database by the one or more secondary system apparatuses according to the current grouping; determine regrouping information of the one or more secondary system apparatuses, so that the one or more secondary system apparatuses re-request the geographic location database for available spectrum resources according to the regrouping information; and optimize, according to the available spectrum resources re-requested by the one or more secondary system apparatuses, spectrum utilization of the one or more secondary system apparatuses.

12 Claims, 16 Drawing Sheets

(56) References Cited

U.S. PATENT DOCUMENTS

2013/0295948 A1* 11/2013 Ye ..................... H04W 72/0453
                                                                      455/452.1
2015/0245374 A1* 8/2015 Mitola, III ............. G06Q 30/08
                                                                      370/329

FOREIGN PATENT DOCUMENTS

| CN | 104219674 A   | 12/2014 |
|----|---------------|---------|
| CN | 104349328 A   | 2/2015  |
| WO | 2014124131 A2 | 8/2014  |

* cited by examiner

FREQUENCY SPECTRUM MANAGEMENT DEVICE AND METHOD, ELECTRONIC DEVICE AND METHOD, AND WIRELESS COMMUNICATION SYSTEM

The present application claims the priority of Chinese Patent Application No. 201610319216.3, titled "FREQUENCY SPECTRUM MANAGEMENT APPARATUS AND METHOD, ELECTRONIC APPARATUS AND METHOD, AND WIRELESS COMMUNICATION SYSTEM", filed on May 13, 2016 with the Chinese State Intellectual Property Office, which is incorporated herein by reference in its entirety.

FIELD

The present disclosure generally relates to the technical field of wireless communications, and more particularly to a spectrum management device, a spectrum management method, an electronic device, a method, and a wireless communication system, which optimize grouping of secondary system apparatuses so that the secondary system apparatuses request available spectrum resources in groups, thereby optimizing spectrum utilization efficiency.

BACKGROUND

With the development of the wireless communication technology, the shortage of spectrum resources becomes more and more severe. The current research indicates that a utilization ratio of allocated licensed spectrum resources is generally not high. The cognitive radio technology; as an intelligent evolution of software radio technology, is key technology to improve an actual utilization ratio of the spectrums. The introduction of the cognitive radio technology can relieve the problem of the shortage of spectrum resources. However, since different modulation signals are transmitted in a same frequency band a signal transmitted by an unlicensed cognitive radio apparatus (an unlicensed user or a secondary system apparatus) may interfere a licensed user (a primary system apparatus) in a same frequency band, or a signal transmitted by a secondary system apparatus having a low priority for utilizing spectrum resources may interfere a secondary system apparatus having a high priority for utilizing the spectrum resources in a same frequency band. Therefore, there is the need to establish a spectrum management device such as a spectrum coordinator and a cognitive engine so as to utilize an advanced algorithm to manage transmission spectrums of the secondary system apparatuses, thus ensuring that communication of the primary system apparatus or communication of the secondary system apparatus with the high priority is free from harmful interference.

Typically, a secondary system apparatus obtains spectrum resources corresponding to a location of the secondary system apparatus from a geographic location database. When the spectrum resources are used, interference occurs since some secondary system apparatuses to may obtain spectrum resources in a same frequency band. These secondary system apparatuses report information about the obtained spectrum resources and interference information to a spectrum management device. The spectrum management device may adjust spectrum utilization of the secondary system apparatuses by a conventional spectrum management algorithm to avoid the interference. However, the adjustment of the spectrum management device must be conducted in a limited range, i.e. in the range of available spectrum resources acquired by the secondary system apparatuses from the geographic location database. Therefore, the optimization performed by the spectrum management device on the spectrum utilization of the secondary system apparatuses is substantially limited, and spectrum resource utilization efficiency is somehow reduced, and in some cases the adjustment cannot even meet a predetermined system performance requirement. In other words, available spectrum resources become a constraint on the coexistence management for the secondary system apparatuses.

FIG. 1 is a schematic diagram showing that coexistence management is limited by available spectrum resources. As shown in FIG. 1, the transmission power that is indicated by a dashed line for an upper limit of transmission power is the maximum transmission power at which a secondary system apparatus operates in available spectrum resources requested from a geographic location database, and the transmission power that is indicated by a dashed line for an actual transmission power is the actual maximum transmission power, which is allocated for the secondary system apparatus within the upper limit of transmission power through the coexistence management by the frequency management device to avoid the interference between the secondary system apparatuses. It can be seen that if the upper limit of transmission power is not changed, no matter how the spectrum management device optimizes the spectrum resource utilization, the maximum actual transmission power of the secondary system apparatus cannot exceed the upper limit of transmission power, and the spectrum resources may not be optimally used by means of such spectrum resource allocation.

SUMMARY

Brief summary of the present disclosure is given below to provide basic understanding for certain aspects of the present disclosure. However, it should be understood that the summary is not an exhaustive summary of the present disclosure. The summary is not intended to determine key parts or important parts of the present disclosure, and is not intended to limit the scope of the present disclosure. An Object of the summary is only to give some concepts of the present disclosure in a simplified form, as a preamble of the following detailed description.

In view this, an object of the present disclosure is to provide a spectrum management device, a spectrum management method, an electronic device, a method, and a wireless communication system, which optimize grouping of secondary system apparatuses so that the secondary system apparatuses request a geographic location database for available spectrum resources according to the optimized grouping, thereby overcoming limitations on the coexistence management for the secondary system apparatuses due to the secondary system apparatuses requesting available spectrum resources in fixed groups or individually.

According to an aspect of the present disclosure, a spectrum management device is provided. The spectrum management device includes a processor. The processor is configured to: adjust, in response to a coexistence management request from one or more secondary system apparatuses, current grouping of the one or more secondary system apparatuses according to a predetermined performance requirement, wherein the coexistence management request comprises at least information about available spectrum resources requested from a geographic location database by the one or more secondary system apparatuses according to the current grouping; determine, according to a result of the adjustment, regrouping information of the one or more secondary system apparatuses, so that the one or more secondary system apparatuses re-request the geographic location database for available spectrum resources according to the regrouping information; and optimize, according to the available spectrum resources re-requested by the one or more secondary system apparatuses, spectrum utilization of the one or more secondary system apparatuses.

According to a preferred embodiment of the present disclosure, the available spectrum resources include a 3.5 GHz frequency band, the one or more secondary system apparatuses include Citizens Broadband Radio Service Devices (CBSDs), and the geographic location database includes a Spectrum Access System (SAS).

According to another preferred embodiment of the present disclosure, the spectrum management device includes a coexistence manager (CM) in an IEEE 802.19 system or a module in charge of coexistence management in a 3.5 GHz system.

According to another preferred embodiment of the present disclosure, the coexistence management request further includes one or more of geographic location information, spectrum requirement information and mobility information of the one or more secondary system apparatuses.

According to another preferred embodiment of the present disclosure, the processor is further configured to adjust, according to at least one of the geographic location information, the spectrum requirement information and the mobility information of the one or more secondary system apparatuses, the current grouping of the one or more secondary system apparatuses.

According to another preferred embodiment of the present disclosure, the processor is further configured to determine, according to the spectrum requirement information, an order in which adjusted groups of the one or more secondary system apparatuses access the geographic location database.

According to another preferred embodiment of the present disclosure, the processor is further configured to adjust, according to primary system interference reference point information corresponding to the one or more secondary system apparatuses, the current grouping of the one or more secondary system apparatuses.

According to another preferred embodiment of the present disclosure, the primary system interference reference point information is included in the coexistence management request of the one or more secondary system apparatuses or is directly obtained from the geographic location database.

According to another preferred embodiment of the present disclosure, the spectrum management device further includes a memory configured to store a predetermined spectrum resource calculation manner. Besides, the processor is further configured to calculate, according to the primary system interference reference point information, available spectrum resources for the one or more secondary system apparatuses utilizing the predetermined spectrum resource calculation manner, and adjust, according to the calculated available spectrum resources and the predetermined performance request, the current grouping of the one or more secondary system apparatuses.

According to another preferred embodiment of the present disclosure, the processor is further configured to calculate, according to the primary system interference reference point information, available spectrum resources for the one or more secondary system apparatuses utilizing a predetermined spectrum resource calculation manna obtained from the geographic location database, and adjust, according to the calculated available spectrum resources and the predetermined performance request, the current grouping of the one or more secondary system apparatuses.

According to another preferred embodiment of the present disclosure, the regrouping information includes one or more of a group identifier and a group spectrum request start time and period of the one or more secondary system apparatuses.

According to another preferred embodiment of the present disclosure, the regrouping information further includes proxy apparatus information corresponding to the one or more secondary system apparatuses, so that secondary system apparatuses in a same group request the geographic location database for the available spectrum resources via a same proxy apparatus in group.

According to another preferred embodiment of the present disclosure, the processor is further configured to coordinate, according to information about secondary system apparatuses managed by other spectrum management device and proxy apparatus information from the other spectrum management device, grouping of the one or more secondary system apparatuses and the secondary system apparatuses managed by the other spectrum management device with the other spectrum management device, so that secondary system apparatuses in a same group request the geographic location database for the available spectrum resources via a same proxy apparatus in group.

According to another preferred embodiment of the present disclosure, the spectrum management device and the geographic location database are integrated together.

According to another preferred embodiment of the present disclosure, the regrouping information is included in a reconfiguration command.

According to another preferred embodiment of the present disclosure, the spectrum management device further includes a communication unit configured to perform data transmission and reception operations.

According to another aspect of the present disclosure, an electronic device in a secondary system apparatus is further provided. The electronic device includes a processor. The processor is configured to: generate a coexistence management request to be sent to a spectrum management device, the coexistence management request comprising at least information about available spectrum resources requested from a geographic location database by the secondary system apparatus according to current grouping; re-request, according to regrouping information from the spectrum management device, the geographic location database for available spectrum resources, the regrouping information being generated by adjusting the current grouping of the secondary system apparatus by the spectrum management device in response to the coexistence management request according to a predetermined performance requirement; and control, based on spectrum utilization optimization process performed by the spectrum management device according to the available spectrum resources re-requested by the secondary system apparatus, the secondary system apparatus to operate in allocated spectrum resources.

According to another aspect of the present disclosure, an electronic device in a proxy apparatus is further provided. The electronic device includes a processor. The processor is configured to: re-request, in response to a spectrum request from one or more secondary system apparatuses, a geographic location database for available spectrum resources for the one or more secondary system apparatuses in groups, wherein the one or more secondary system apparatuses are re-grouped by a spectrum management device according to a coexistence management request from the one or more secondary system apparatuses and a predetermined performance requirement, the coexistence management request comprising at least information about available spectrum resources requested from the geographic location database by the one or more secondary system apparatuses according to current grouping; and determine a spectrum response comprising the available spectrum resources re-requested from the geographic location database so as to notify the one or more secondary system apparatuses.

According to another aspect of the present disclosure, a wireless communication system is further provided. The wireless communication system includes geographic location database, one or more secondary system apparatuses, and a spectrum management device. The one or more secondary system apparatuses are configured to: generate a coexistence management request to he sent to a spectrum management device, the coexistence management request comprising at least information about available spectrum resources requested from the geographic location database by the one or more secondary system apparatuses according to current grouping; re-request, according to regrouping information from the spectrum management device, the geographic location database for available spectrum resources; and operate in allocated spectrum resources based on spectrum utilization optimization process performed by the spectrum management device according to the available spectrum resources re-requested by the one or more secondary system apparatuses. The spectrum management device is configured to: adjust, in response to the coexistence management request, the current grouping of the one or more secondary system apparatuses according to a predetermined performance requirement; determine, according to a result of the adjustment, the regrouping information of the one or more secondary system apparatuses; and optimize, according to the available spectrum resources re-requested by the one or more secondary system apparatuses, spectrum utilization of the one or more secondary system apparatuses.

According to other aspects of the present disclosure, there are further provided with a spectrum management method, a method in a secondary system apparatus, and a method in a proxy apparatus corresponding to the above device embodiments.

According to other aspects of the present disclosure, there are further provided with computer program codes and computer program products for implementing the methods or functions of the corresponding devices according to the present disclosure described above, as well as a computer readable storage medium having the computer program codes stored thereon for implementing the methods according to the present disclosure described above.

According to the embodiments of the present disclosure, grouping of the secondary system apparatuses is adjusted so that they request available spectrum resources from the geographic location database according to the optimized grouping. Thus, it becomes possible to further optimize the spectrum resource utilization and improve the system performance.

Other aspects of the embodiments of the present disclosure are given in the following description, and the detailed description is intended to fully disclose preferred embodiments of the embodiments of the present disclosure, but not to limit the present disclosure.

BRIEF DESCRIPTION OF THE DRAWINGS

The present disclosure can be understood better with reference to the detailed description given in conjunction with the drawings in the knowing. The same or similar element is indicated by the same or similar reference numeral throughput all the drawings. The drawings, together with the following detailed illustration, are included in the description and form a part of the description, and are used to further illustrate preferred embodiments of the present disclosure and explain principles and advantages of the present disclosure by examples. In the drawings.

DETAILED DESCRIPTION OF EMBODIMENTS

Figure 1:
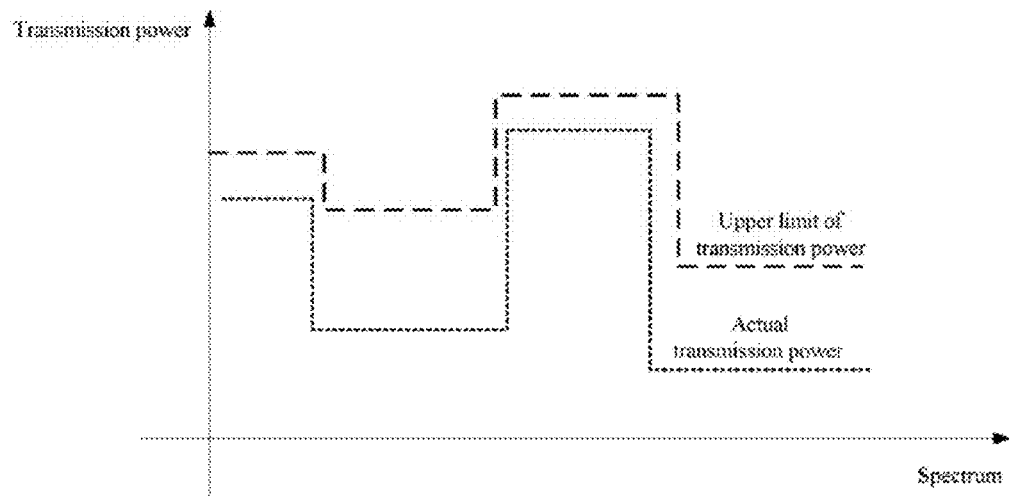
FIG. 1 is a schematic diagram showing that coexistence management is limited by available spectrum resources.

Exemplary embodiments of the present disclosure are described below in conjunction with the drawings. For the sake of clarity and conciseness, not all the features of to practical implementations are described in the specification. However, it should be appreciated that numerous implementation-specific decisions shall be made during developing any of such practical implementations so as to achieve the developer's specific goals, for example, to conform to constraints related to system and service that may vary with different implementations. In addition, it should further be understood that although the developing work may be very complicated and time-consuming, it is only a routine task for those skilled in the art benefitting from the present disclosure.

It shall further be noted here that only those apparatus structures and/or process steps closely relevant to the solutions of the present disclosure are illustrated in the drawings while other details less relevant to the present disclosure are omitted so as not to obscure the present disclosure due to those unnecessary details.

Before the embodiments of the present disclosure are specifically described, a brief introduction of some concepts in the present disclosure is given below to facilitate understanding of the present disclosure.

Primary System and Secondary System

A primary system refers to a system that has a legal right to use spectrum resources. There may be a primary base station/a primary access point and one or more users (primary users) in the primary system. A secondary system, which is also referred to as a cognitive radio apparatus in some documents, can only opportunistically use a spectrum when it does not result in any harmful interference on communication of the primary system with the spectrum. The secondary system may include a secondary system apparatus including a secondary base station/a secondary access point and one or more users (secondary users). The secondary system may be a communication system that has no right to use the spectrum, for example, a secondary system which opportunistically utilizes resources of a 3.5 GHz frequency band to perform communication (hereinafter also referred to as a 3.5 GHz system), an LIE communication system which opportunistically utilizes resources of the wifi/radar frequency bands to perform communication, or a wifi communication system which opportunistically utilizes resources of the frequency bands for radio and television broadcast. Alternatively, the secondary system may also be a system that has a right to use the spectrum, but has a lower priority for spectrum utilization than the primary system. For example, in a case that a new base station is deployed by an operator to provide a new service, an existing base station and a service provided by the existing base station are deemed as the primary system and have a priority for spectrum utilization, while the new base station and the service provided by the new base station are deemed as the secondary system and have a relatively low priority for spectrum utilization.

It is required in such a communication mode in which the primary system coexists with the secondary system that an application of the secondary system will not adversely affect an application of the primary system or even a secondary system with a high priority. In other words, an influence caused by the spectrum utilization of the secondary system can be controlled within an allowable range for the primary system, and further within an allowable range for the secondary system with the high priority. When interference on the primary system and/or the secondary system with high priority is ensured to be within a certain range, that is, the interference does not exceed an interference threshold, multiple secondary systems may use spectrum resources that are available to the primary system and/or the secondary system with the high priority.

It should be noted that in an application scenario where the secondary systems are distinguished by their priorities (high or low), the resources are preferentially allocated to the secondary system with the high priority, and the secondary system with the low priority may opportunistically use resources not being occupied by the secondary system with the high priority. Therefore, in this example, the secondary system with the high priority may also be regarded as a primary system.

Geographic Location Database (GLDB)

Currently, a main way of protecting the primary system is to store coverage information of the primary system in a database (for example, a geographic location database (GLDB) or a cognitive engine database). Information of the primary system, such as an allowable interference limit of the primary system, a spectrum resource usage condition of the primary system, and the like, is also stored in the database. Firstly, a secondary system in the same region as the primary system accesses the database and submits state information such as location information, a spectrum emission mask, a transmission bandwidth, a carrier frequency of the secondary system, and the like, before using a spectrum of said primary system. The database then calculates an amount of interference by the secondary system on the primary system based on the state information of the secondary system, and calculates estimated available spectrum resources for the secondary system in the current state based on the calculated amount of interference by the secondary system on the primary system in the current state. The definition of the geographic location database and the specific method of determining the estimated available spectrum resources by the geographic location database are known in the prior art; for example, one may refer to a reference "Draft of ECC report: Technical and operational requirements for the operation of white space devices under geo-graphic location approach", CEPT, ECC186, January 2013. The detailed description thereof is omitted herein.

Spectrum Coordinator

As described above, in the cognitive radio technology, normal operation of the primary system is generally protected by the geographic location database, and the secondary system may directly access the geographic location database to acquire available spectrum resources. In further developed technology, a spectrum coordinator is further arranged on the secondary system side, mainly for managing/coordinating coexistence among the secondary systems (for example, when multiple secondary systems whose positions are close to each other all desire to use the spectrum resources of the primary system, the spectrum coordinator needs to perform coordination), thereby improving spectrum utilization efficiency and communication quality of the secondary systems. Specifically, the spectrum coordinator collects information of the secondary systems managed by the spectrum coordinator, and requests the database to calculate the available resources. After the available resources are acquired, the spectrum coordinator adjusts, for example, based on priorities or QoS requirements of the secondary systems, the utilization of the corresponding resources within the range of the available spectrum resources, and allocates the resources to the secondary systems.

It should be noted that, in the conventional cognitive radio technology, the spectrum coordinator and the geographic location database may be arranged separately or integrally. The geographic location database is mainly utilized in calculating, based on state information such as geographic locations of the secondary systems, the available spectrum resources which do not interfere the primary system, while the spectrum coordinator is mainly utilized in managing/coordinating coexistence among the secondary systems (for example, when multiple secondary systems in close positions all desire to use the spectrum resources of the primary system, the spectrum coordinator needs to perform coordination).

Figure 2:
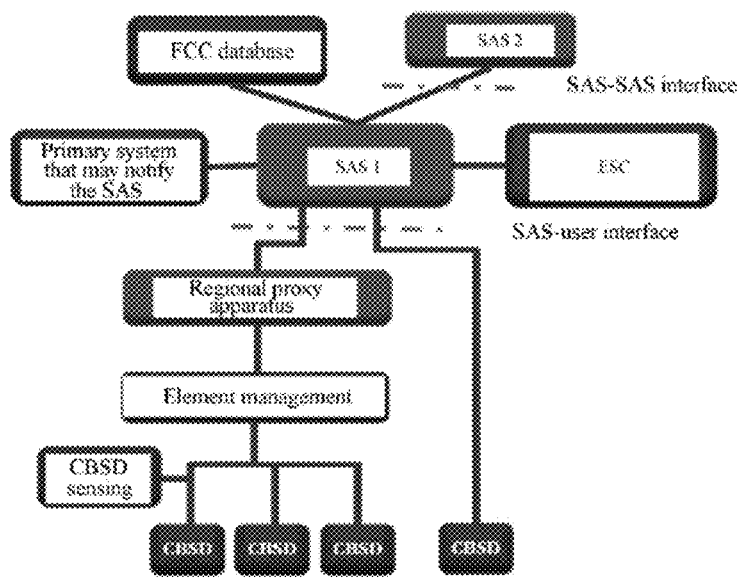
FIG. 2 is a schematic diagram showing an example of an architecture of a 3.5 GHz system.

In a 3.5 GHz system, as secondary system apparatuses, CBSDs may request available spectrum resources from a SAS as a geographic location database via a regional proxy server in groups, or may separately request available spectrum resources directly from the SAS. The SAS may authorize and manage spectrum utilization of the CBSDs. FIG. 2 shows an example of an architecture of a 3.5 GHz system. As shown in FIG. 2, the system may include a SAS (SAS1, SAS2) as a geographic location database, a primary system that may notify the SAS (informing incumbent), a Federal Communications Commission (FCC) database that stores information of the primary system and a spectrum resource calculation manner, a regional proxy server, and CBSDs as secondary system apparatuses. The SAS may have the environmental sensing capability (ESC), the CBSDs may access the SAS via the regional proxy server in groups or access the SAS directly, and the CBSDs may optionally have the environmental sensing capability.

Figure 3:
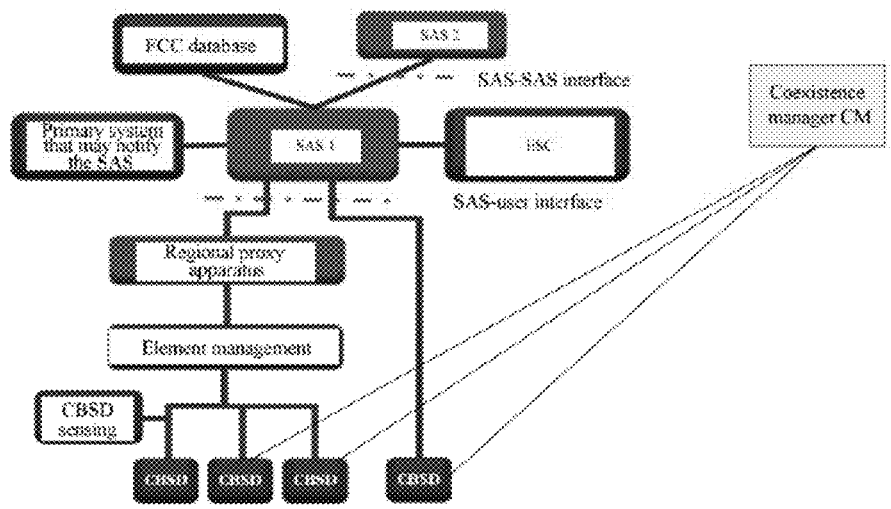
FIG. 3 is a schematic diagram showing an example of a system framework in which a 3.5 GHz system is combined with an IEEE 802.19 system.

In addition, a coexistence management system is being developed by the International Institute of Electrical and Electronic Engineers (IEEE) to optimize spectrum utilization of secondary system apparatuses. That system may be hereinafter referred to as an IEEE 802.19 system. If the IEEE 802.19 system is combined with the 3.5 GHz system as described above, a coexistence manager (CM) of the IEEE 802.19 system can perform coexistence management on the CBSDs in the 3.5 GHz system to optimize the spectrum utilization of the CBSDs. FIG. 3 shows an example of a system framework in which a 3.5 GHz system is combined with an IEEE 802.19 system.

It should be noted that although in the following description of the embodiments of the present disclosure, the technology of the present disclosure is described by taking a combination of the 3.5 GHz system and the IEEE 802.19 system as an example, it can be appreciated that the present disclosure is apparently not limited thereto and is applicable to any secondary system requiring coexistence management (for example, the LTE system or the wifi system described above) and any spectrum management device that can implement the coexistence management function of the present disclosure.

The embodiments of the present disclosure are described below in detail with reference to FIGS. 4 to 20.

Figure 4:
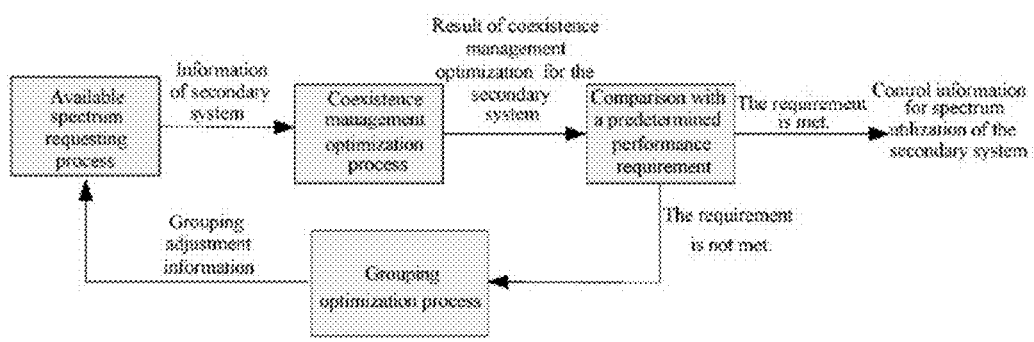
FIG. 4 is a schematic diagram showing a principle of the technology according to the present disclosure.

Firstly, a principle of the present disclosure is briefly described with reference to FIG. 4, which is a schematic diagram showing a principle of the technology according to the present disclosure.

As described above, the spectrum management device generally performs coexistence management on the secondary system apparatuses according to available spectrum resources requested by the secondary system apparatuses in predetermined groups or separately, and such coexistence management is often limited by the available spectrum resources, so that the spectrum resource utilization is not optimal. Even for a same number of secondary system apparatuses, they may obtain different results of allocation of available spectrum resources by requesting available spectrum resources from the geographic location database separately or in different groups. Therefore it is considered to adjust grouping of the secondary system apparatuses to optimize the spectrum resources available for the secondary system apparatuses, and thus the spectrum management device may perform coexistence management within the range of the optimized available spectrum resources to optimize the system performance.

In a conventional spectrum management method, the spectrum management device performs coexistence management based on only the obtained information of the secondary system (including information about the available spectrum resources), which is substantially an open-loop control. However, the coexistence management according to the embodiment of the present disclosure is substantially a closed-loop control. Specifically, as shown in FIG. 4, according to an embodiment of the present disclosure, the spectrum management device may perform grouping optimization according to a result of the coexistence management based on the current grouping and a predetermined performance requirement, and feedback the result of the grouping optimization to the secondary system apparatuses. Thus, the secondary system apparatuses may re access the geographic location database according to the optimized grouping, and the spectrum management device may then perform coexistence management according to available spectrum resources that are re-requested by the secondary system apparatuses based on the optimized grouping. In this way, the spectrum resource utilization may be further optimized to meet the predetermined performance requirement.

Next, a functional configuration example of a spectrum management device according to an embodiment of the present disclosure is described with reference to FIG. 5, which is a block diagram showing a functional configuration example of a spectrum management device according to an embodiment of the present disclosure.

Figure 5:
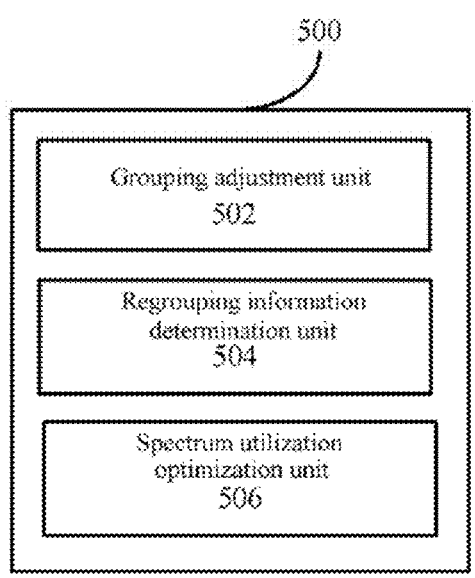
FIG. 5 is a block diagram showing a functional configuration example of a spectrum management device according to an embodiment of the present disclosure.

As shown in FIG. 5, a spectrum management device 500 according to the embodiment may include a grouping adjustment unit 502, a regrouping information determination unit 504, and a spectrum utilization optimization unit 506. It should be noted that the functional units described herein are merely logical function modules that are divided according to the implemented specific functions, and specific implementations thereof are not limited. In actual implementations, the above functional units may be implemented as separate physical entities, or may be implemented by a single entity (for example, a processor (a CPU, a DSP or the like), an integrated circuit, or the like).

The grouping adjustment unit 502 may be configured to adjust, in response to a coexistence management request from one or more secondary system apparatuses, current grouping of the one or more secondary system apparatuses according to a predetermined performance requirement. The coexistence management request includes at least information about available spectrum resources requested from a geographic location database by the one or more secondary system apparatuses according to the current grouping.

Specifically, the spectrum management device 500 may optimize, based on a received coexistence management request, spectrum utilization of one or more secondary system apparatuses by a conventional coexistence management method, to reduce interference among the secondary system apparatuses, while transmission power of each secondary system apparatus must be in a range that is not beyond an upper limit for the transmission power. However, if it is found that the spectrum utilization optimization based on current grouping cannot meet a predetermined performance requirement (for example, the transmission power required by the secondary system apparatus), the grouping adjustment unit 502 of the spectrum management device 500 may adjust the current grouping of the one or more secondary system apparatuses to further optimize spectrum utilization of the secondary system apparatuses, so as to meet the predetermined performance requirement.

The process regarding how the grouping adjustment unit 502 adjusts grouping of one or more secondary system apparatuses is described below in detail as an example.

Preferably, the coexistence management request may further include other information related to the one or more secondary system apparatuses, for example, one or more of geographic location information, spectrum requirement information and mobility information of the one or more secondary system apparatuses. Thus, the grouping adjustment unit 502 may adjust, based on one or more of the above information, the grouping of the secondary system apparatuses by at least one of the following implementations.

Implementation 1: the grouping is adjusted based on the spectrum requirement information. Different secondary systems involve different spectrum requirements depending upon different applications. For example, secondary system apparatuses in the Internet of Things do not require a large amount of spectrum resources, while secondary system apparatuses providing hotspots of a cell require a large amount of spectrum resources. If these secondary system apparatuses simultaneously request available spectrum resources, it is possible that the spectrum resources are evenly allocated to them. Thus, a secondary system apparatus with a low spectrum resource requirement may obtain a lot of spectrum resources that are not necessary, thereby resulting in resource wasting; and a secondary system apparatus with a relatively high spectrum resource requirement may be not allocated with more spectrum resources, thereby resulting in decreased system performance. In view of this, when requesting coexistence management, the secondary system apparatuses may transmit spectrum requirement information or application information thereof to the spectrum management device, so that the spectrum management device may group these secondary system apparatuses according to the spectrum requirements. As an example, the spectrum management device may classify secondary system apparatuses with high spectrum requirements into one group and make the number of the apparatuses in the group relatively small, so that each secondary system apparatus in the group may be allocated with more spectrum resources. Further, the spectrum management device may classify secondary system apparatuses with low spectrum requirements into one group and make the number of the apparatuses in the group relatively large, so that the spectrum resources can be fully utilized to avoid wasting. In addition, preferably, the spectrum management device may determine, according to different levels of the spectrum requirements, an order in Which the adjusted groups of the one or more secondary system apparatuses access the geographic location database. For example, a group in which the secondary system apparatuses with high spectrum requirements are classified may first access the geographic location database to obtain sufficient spectrum resources, and then a group in which the systems with low spectrum requirements are classified accesses the geographic location database.

Figure 6:
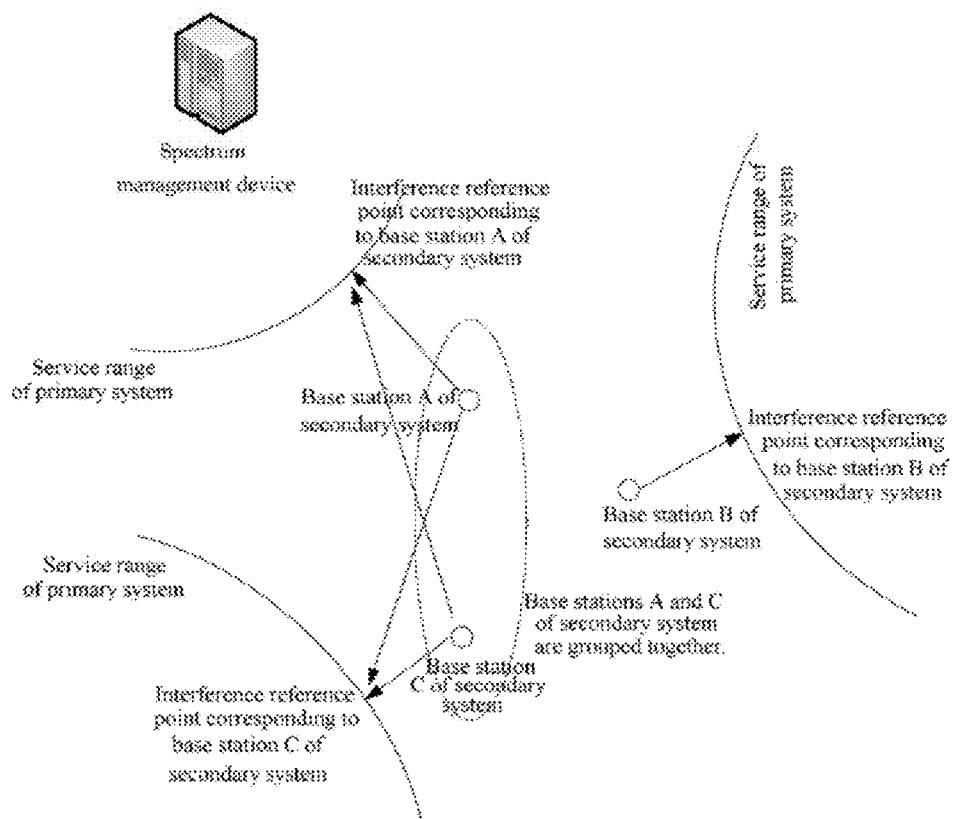
FIG. 6 is a schematic diagram showing primary system interference reference points corresponding to the secondary systems.

Implementation 2: the grouping is adjusted based on the geographic location information. Generally, if possible, the spectrum management device may classify secondary system apparatuses whose geographic locations are close to each other in one group to make a spectrum resource request. The reason for such classifying is as follows. The secondary system apparatuses whose geographic locations are close to each other cause substantially the same interference on the primary system. Thus, when the geographic location database allocates available spectrum resources to these secondary system apparatuses, they may obtain relatively similar or the same available spectrum resources, which simplifies the coexistence management process. Preferably, as an example, in a case that primary system interference reference point information corresponding to each secondary system apparatus is obtained, the spectrum management device may further rank the determined groups according to the magnitudes of distances to the primary system interference reference points. For example, a group in which the secondary system apparatuses far away from the reference points are classified may first access the geographic location database to obtain available spectrum resources, thus ensuring that as many secondary system apparatuses as possible can obtain spectrum resources. The reason for the above operations in this example is as follows. The secondary system apparatuses near the reference points cause substantial interference on the primary system, and if the interference caused by these secondary system apparatuses on the primary system is accumulated to an upper limit of allowable interference for the primary system, a large number of other secondary system apparatuses will become unable to obtain available spectrum resources. FIG. 6 is a schematic diagram showing primary system interference reference points corresponding to secondary systems. It should be noted that the primary system interference reference point information herein may be included in a coexistence management request from a secondary system apparatus. Alternatively, the operation of the geographic location database needs to comply with regulations of various countries or regions. According to the regulations of some countries or regions, in some countries, information of the primary system is not allowed to be transmitted to the secondary system apparatuses for security concerns. In this case, if the spectrum management device is authorized by the country or region to connect the geographic location database, the spectrum management device may acquire the corresponding primary system interference reference point information directly from the geographic location database. That is, after calculating the available spectrum to resources for each secondary system apparatus, the geographic location database may transmit information about the calculated available spectrum resources to the secondary system apparatus, while transmitting the primary system interference reference point information corresponding to the secondary system apparatus to the spectrum management device and identifying the secondary system apparatus to the spectrum management device. Thus, when the secondary system apparatus requests the coexistence management from the spectrum management device, the spectrum management device may check the primary system interference reference point information corresponding to the secondary system apparatus, for coexistence management.

Implementation 3: the grouping is adjusted based on the mobility information. Different secondary system apparatuses have different mobility. According to regulations, when a secondary system apparatus moves beyond a certain range, it needs to re-access the geographic location database to obtain available spectrum resources. Therefore, a large amount of signalling overhead is inevitably generated when different secondary system apparatuses access the database according to their respective frequencies of activities. Hence, the spectrum management device may group the secondary system apparatuses according to the frequencies of the accesses (i.e., the mobility of the secondary system apparatuses), and set a common spectrum access period for secondary system apparatuses in a same group to save the signaling overhead.

It can be understood that although the three implementations for determining grouping of secondary system apparatuses are separately described above, in adjusting the grouping of the secondary system apparatuses, the spectrum management device may comprehensively consider two or three of the above implementations according to actual conditions to determine the actual grouping. In addition, the three exemplary implementations as described above are all rough grouping methods based on the information of the secondary system apparatuses. In the case that the primary system interference reference point information of the secondary system apparatuses is obtained as described above, if the spectrum management device can further obtain the spectrum resource calculation manner of the region or country (for example, the FCC rules for the television frequency bands, ECC 186 in Europe, "3.5 GHz" rules in the U.S., and the like), the spectrum management device may assume different grouping of the secondary system apparatuses, and simulate the calculation by the geographic location database regarding aggregate interference by the secondary system apparatuses on the primary system under each grouping to determine respective available spectrum resources for the different grouping, thereby determining optimal grouping among the different grouping according to the predetermined performance requirement for the secondary system apparatuses. As shown in FIG. 6, for example, a base station A of a secondary system and a base station C of a secondary system may be classified in one group by calculating aggregate interference by the secondary system apparatuses on a primary system according to primary system interference reference point information.

The specific process regarding how to calculate available spectrum resources for the secondary system apparatuses according to the information of the primary system, the information of the secondary systems and the spectrum resource calculation manner is similar to the calculation process of the geographic location database, and one may refer to related description in the prior art, which is not repeated herein. It should be understood that the spectrum resource calculation manner as described above may be stored in advance in a memory of the spectrum management device 500, or may also be acquired by the spectrum management device from the geographic location database.

It can be understood that the above grouping adjustment implementations are only exemplary but not limitative, and other grouping adjustment implementations may be obtained by those skilled in the art according to actual conditions, as long as the system performance and spectrum utilization efficiency can be optimized after re-grouping. For example, the spectrum management device may simply traverse all possible grouping of the secondary system apparatuses and compare performance of the secondary system apparatuses under each grouping with a predetermined performance requirement, so as to determine the final grouping. However, this implementation may result in low execution efficiency and a large computational load.

The regrouping information determination unit 504 may be configured to determine, according to a result of the adjustment of the grouping adjustment unit 502, regrouping information of the one or more secondary system apparatuses, so that the one or more secondary system apparatuses re-request the geographic location database for available spectrum resources according to the regrouping information. The regrouping information may preferably include one or more of a group identifier, and a group spectrum request start time and period.

In addition, as described above, in some systems such as the 3.5 GHz system, there is a regional proxy apparatus, so that the secondary system apparatus can request the geographic location database for available spectrum resources in groups via the regional proxy apparatuses. In this case, the regrouping information may further include proxy apparatus information corresponding to the one or more secondary system apparatuses, so that secondary system apparatuses in a same group access the geographic location database in group via a same proxy apparatus.

Figure 7:
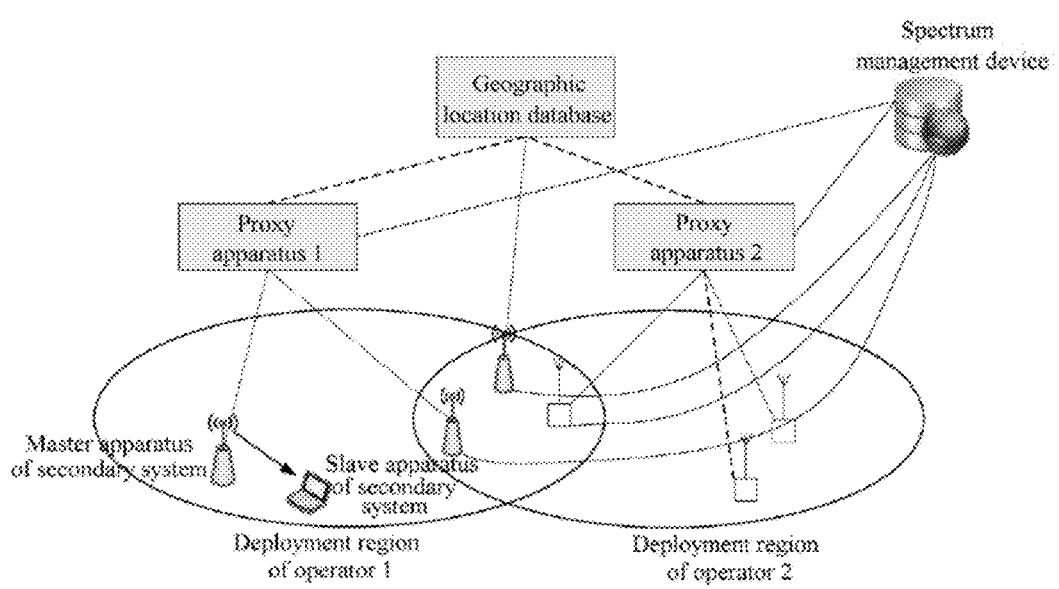
FIG. 7 is a schematic diagram showing coexistence management in the presence of multiple proxy apparatuses.

Specifically, reference is made to FIG. 7, which is a schematic diagram showing coexistence management in the presence of multiple proxy apparatuses. As shown in FIG. 7, in a case that there are multiple proxy apparatuses in a certain region, different operators provide different network apparatuses, and these network apparatuses access the geographic location database via the respective proxy apparatuses. If these secondary system apparatuses all subscribe to the coexistence management service, they can be connected to the spectrum management device, and the spectrum management device may in turn be connected to the proxy apparatuses to obtain relevant information (for example, address information) of the proxy apparatuses. Generally, secondary system apparatuses of different operators cannot be grouped together to make a spectrum resource request because they use different proxy apparatuses. Therefore, after determining the regrouping information of the secondary system apparatuses, the spectrum management device may include the information (for example, address information) of the corresponding proxy apparatuses in the regrouping information to be transmitted to the secondary system apparatuses, so that secondary system apparatuses (which may belong to different operators) that are classified in a same group can access the geographic location database via a same proxy apparatus. As an example, the regrouping information may be carried in grouping control signaling (e.g., a reconfiguration command) to be transmitted to the secondary system apparatuses.

Figure 8:
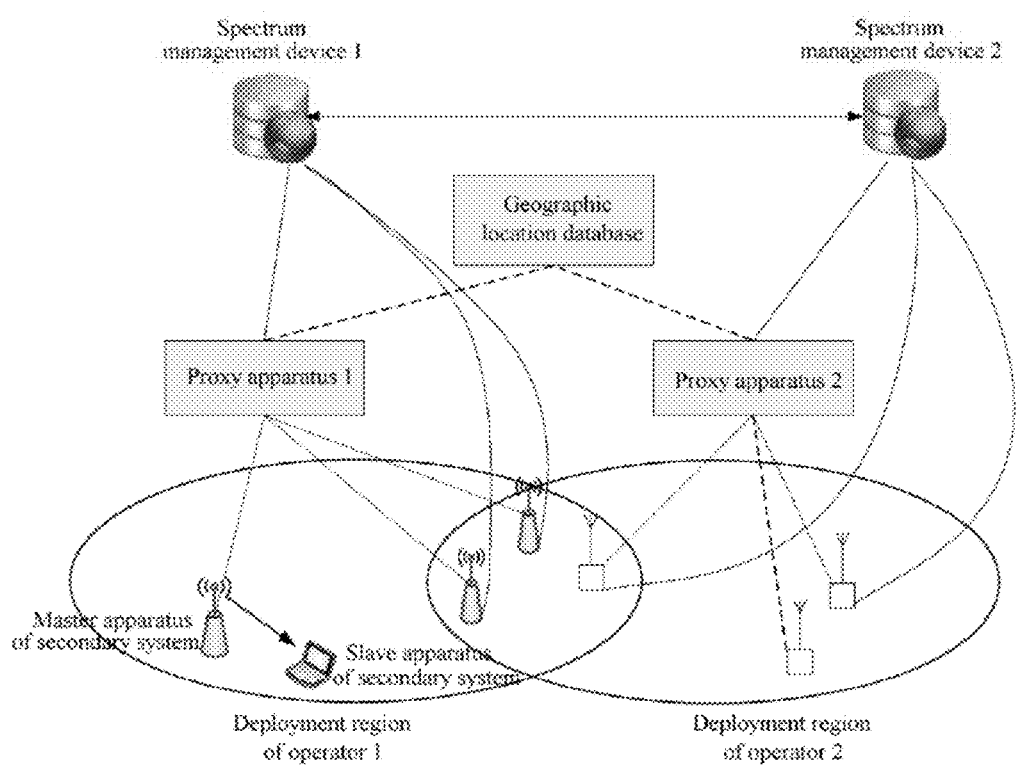
FIG. 8 is a schematic diagram showing coexistence management in the presence of multiple spectrum management devices.

Preferably, when secondary systems of different operator systems are connected to different spectrum management devices, the spectrum management devices may exchange their information of the secondary systems and proxy apparatus information (optionally) for grouping coordination. FIG. 8 is a schematic diagram showing coexistence management in the presence of multiple spectrum management devices. As shown in FIG. 8, a secondary system of an operator 1 is connected to a spectrum management device 1, and a secondary system of an operator 2 is connected to a spectrum management device 2. Hence, the two to spectrum management devices may exchange their information of the secondary systems (including, for example, location information, information about available spectrums, and the like) and proxy apparatus information for grouping coordination, so that secondary system apparatuses (which may include secondary system apparatuses belonging to different spectrum management devices) in a same group access the geographic location database in group via a same proxy apparatus, to optimize the spectrum utilization.

Referring back to FIG. 5, the spectrum utilization optimization unit 506 may be configured to optimize, according to available spectrum resources reacquired from the geographic location database by the one or more secondary system apparatuses based on the adjusted grouping, spectrum utilization of the secondary system apparatuses by a conventional coexistence management method. The optimization process is the same as that in the prior art, which is not repeated herein.

Preferably, the geographic location database and the spectrum management device may be integrated together or may be separate devices. In addition, preferably, in the case that the above technology is applied to the 3.5 GHz system and the IEEE 802.19 system, the available spectrum resources include a 3.5 GHz frequency band, the secondary system apparatus includes a CBSD, the geographic location database includes a SAS, and the spectrum management device may include a CM. The present disclosure is certainly not limited to this application, and is applicable to any secondary system requiring coexistence management and a corresponding spectrum management device, for example, a device in charge of coexistence management provided in the 3.5 GHz system.

It can be understood that the above spectrum management device 500 may be implemented at a chip level, or may be implemented at an apparatus level by including other external components. For example, the spectrum management device 500 may further include a communication unit (for example, a transceiver and the like), for performing data transmission and reception operations.

In addition, it should be noted that although the functional configuration example of the spectrum management device is described above with reference to FIG. 5, those skilled in the art may modify the above functional configuration example according to the principle of the present disclosure, for example, adding, deleting, combining, sub-combining and/or changing the function modules, and all of such variations should be deemed as filling within the scope of the present disclosure.

Corresponding to the spectrum management device described above, the present disclosure further provides an electronic device in a secondary system apparatus as below. A functional configuration example of an electronic device in a secondary system apparatus according to an embodiment of the present disclosure is described below with reference to FIG. 9, which is a block diagram showing a functional configuration example of an electronic device in a secondary system apparatus according to an embodiment of the present disclosure.

Figure 9:
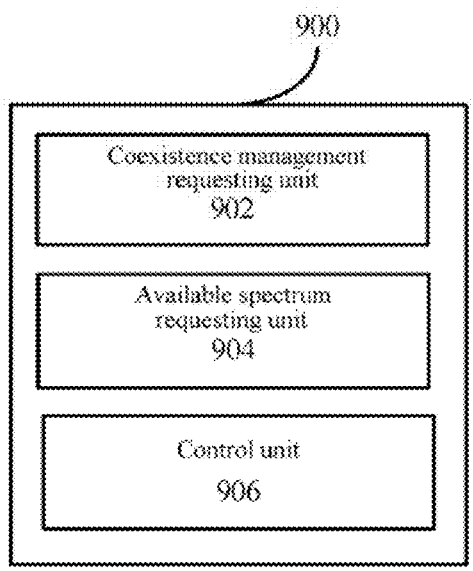
FIG. 9 is a block diagram showing a functional configuration example of an electronic device in a secondary system apparatus according to an embodiment of the present disclosure.

As shown in FIG. 9, an electronic device 900 according to the embodiment may include a coexistence management requesting unit 902, an available spectrum requesting unit 904, and a control unit 906. It should be understood that the units described herein are merely logical function modules that are divided according to implemented specific functions, and specific implementations thereof are not limited. In actual implementations, the above functional units may be implemented as separate physical entities, or may be implemented by a single entity (for example, a processor (a CPU, a DSP or the like), an integrates circuit, or the like).

The coexistence management requesting unit 902 may be configured to generate a coexistence management request to be sent to a spectrum management device. The coexistence management request includes at least information about available spectrum resources requested from a geographic location database by the secondary system apparatus according to current grouping. Specifically, before communication, the secondary system apparatus needs to access the geographic location database to obtain available spectrum resources and permission, and to transmit, after obtaining the available spectrum resources, the available spectrum resources to the spectrum management device, and to request coexistence management, so as to reduce mutual interference between the secondary system apparatuses. Preferably, the coexistence management request may further include one or more of geographic location information, spectrum requirement information and mobility information of the secondary system apparatus, and may further include primary system interference reference point information corresponding to the secondary system apparatus. Then, after the spectrum management device receives the coexistence management request, it may adjust grouping of the secondary system apparatus according to a predetermined to performance requirement in the manner as described above and determine regrouping information for the secondary system apparatus.

The available spectrum requesting unit 904 may be configured to re-request, according to regrouping information from the spectrum management device, the geographic location database fur available spectrum resources. The regrouping information may be included in, for example, a reconfiguration command of the spectrum management device. The regrouping information may include a group identifier, and a group spectrum request start time and period. Preferably, the regrouping information may further include proxy apparatus information corresponding to the secondary system apparatus, so that the available spectrum requesting unit 904 may adjust the proxy apparatus to be accessed according to the proxy apparatus information, so as to re-request the geographic location database for available spectrum resources via the corresponding proxy apparatus in groups. That is, the secondary system apparatus may access the geographic location database either directly or indirectly via a proxy apparatus. In the case where the geographic location database is accessed via a proxy apparatus, the spectrum request made by the available spectrum requesting unit 904 to the corresponding proxy apparatus further includes a group identifier and geographic location information of the secondary system apparatus, so that the proxy apparatus may request, according to the group identifier, the geographic location database for available spectrum resources for the secondary system apparatus in groups.

In addition, preferably, as described above, the spectrum management device may determine, according to the spectrum requirement information of the secondary system apparatus, an order in which the secondary system apparatus accesses the geographic location database. Hence, the available spectrum requesting unit 904 may be further configured to request, according to the access order, the geographic location database for available spectrum resources.

The control unit 906 may be configured to control, based on spectrum utilization optimization process performed by the spectrum management device according to the available spectrum resources that are re-requested by the secondary system apparatus, the secondary system apparatus to operate in allocated spectrum resources.

It can be understood that the above electronic device 900 may be implemented at a chip level, or may be implemented at an apparatus level by including other external components. For example, the electronic device 900 may be a complete machine operating as a secondary system apparatus, and may further include a communication unit such as a transceiver, for performing data transmission and reception operations.

It should be noted here that the electronic device in a secondary system apparatus described herein with reference to FIG. 9 corresponds to the embodiment of the spectrum management device described above, and thus for the contents not described in detail herein, one may refer to the above description at corresponding positions which are not repeated herein.

Corresponding to the embodiments of the spectrum management device and the secondary system apparatus described above, the present disclosure further provides an electronic devices in a proxy apparatus as below. A functional configuration example of an electronic device in a proxy apparatus according to on embodiment of the present disclosure is described in detail below with reference to FIG. 10, which is a block diagram showing a functional configuration example of an electronic device in a proxy apparatus according to an embodiment of the present disclosure.

Figure 10:
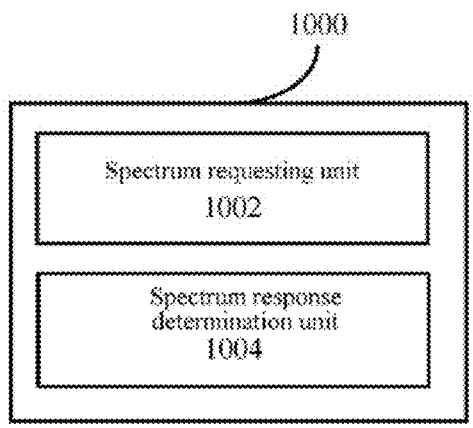
FIG. 10 is a block diagram showing a functional configuration example of an electronic device in a proxy apparatus according to an embodiment of the present disclosure.

As shown in FIG. 10, an electronic device 1000 according to the embodiment may include a spectrum requesting unit 1002 and a spectrum response determination unit 1004. It should be understood that the units described herein are merely logical function modules that are divided according to implemented specific functions, and specific implementations thereof are not limited. In actual implementations, the above functional units may be implemented as separate physical entities, or may be implemented by a single entity (for example, a processor (a CPU, a DSP or the like), an integrated circuit, or the like).

The spectrum requesting unit 1002 may be configured to re-request, in response to a spectrum request from one or more secondary system apparatuses, a geographic location database for available spectrum resources for the one or more secondary system apparatuses in groups. As described above, after the spectrum management device optimizes the grouping of one or more secondary system apparatuses according to a predetermined performance requirement, the one or more secondary system apparatuses may access the geographic location database by sending a spectrum request to a corresponding proxy apparatus. The spectrum request may include a group identifier of the secondary system apparatuses, and may further include geographic location information of the secondary system apparatuses. Hence, the spectrum requesting unit 1002 may request, according to the group identifier, the geographic location database for available spectrum resources in groups. Then, the geographic location database may calculate, according to the group spectrum request, available spectrum resources for the secondary system apparatuses under the current grouping by the stored spectrum resource calculation manner, and feedback the same to the proxy apparatuses.

The spectrum response determination unit 1004 may be configured to determine a spectrum response including the available spectrum resources re-requested from the geographic location database to notify the one or more secondary system apparatuses, so that the secondary system apparatuses may re-request, according to the spectrum response, the coexistence management from the spectrum management device, so as to optimize the spectrum utilization.

Preferably, as described above, the proxy apparatus is selected by the secondary system apparatus according to an instruction from the spectrum management device. That is, when the spectrum management device transmits regrouping information to the secondary system apparatuses, it also includes the corresponding proxy apparatus in the regrouping information, so that secondary system apparatuses in a same group can choose to access a same proxy apparatus so as to access the geographic location database in group.

It can be understood that the above electronic device 1000 may be implemented at a chip level, or may be implemented at an apparatus level by including other external components. For example, the electronic device 1000 may be a complete machine operating as a proxy apparatus, and may further include a communication unit such as a transceiver, for performing data transmission and reception operations.

It should be noted here that the electronic device in a proxy apparatus described herein with reference to FIG. 10 corresponds to the embodiments of the spectrum management device and the secondary system apparatus described above, and thus for the contents not described in detail herein, one may refer to the above description at corresponding positions which are not repeated herein.

Figure 11:
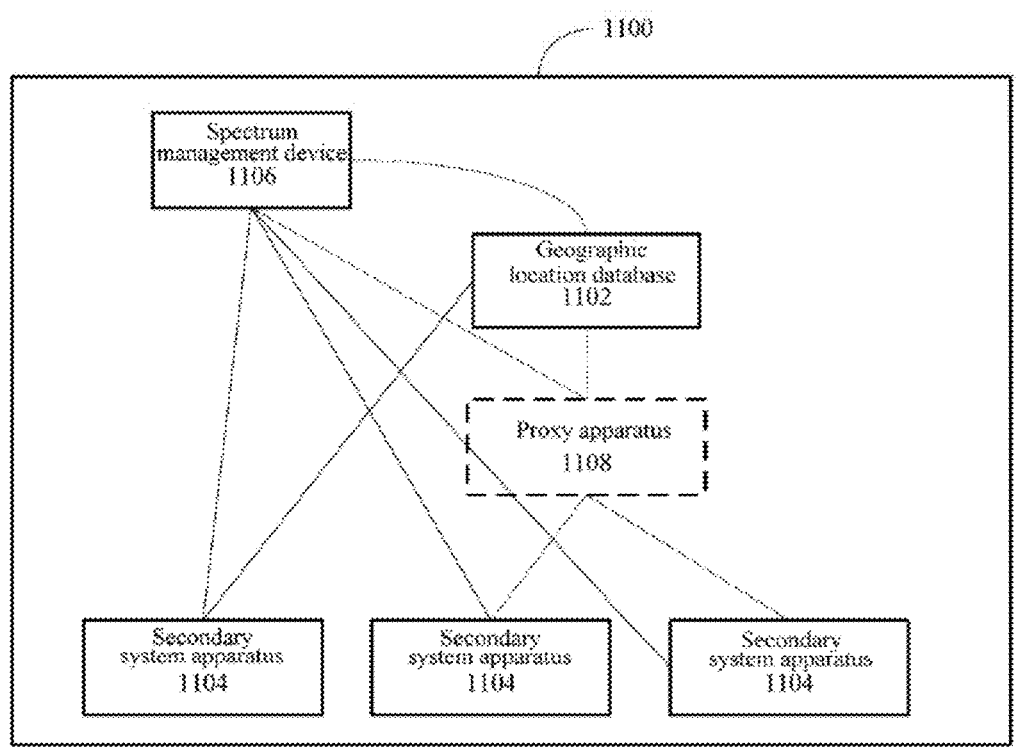
FIG. 11 is a block diagram showing a configuration example of a wireless communication system according to an embodiment of the present disclosure.

FIG. 11 is a block diagram showing a configuration example of a wireless communication system according to an embodiment of the present disclosure.

As shown in FIG. 11, a wireless communication system 1100 according to the embodiment may include a geographic location database 1102, one or more secondary system apparatuses 1104, and a spectrum management device 1106. The secondary system apparatus 1104 and the spectrum management device 1106 here respectively correspond to the device embodiments described above with reference to FIGS. 9 and 5, and details thereof are not repeated herein. Alternatively, the geographic location database 1102 may be integrated in the spectrum management device 1106. It should be noted that in FIG. 11, a proxy apparatus is indicated by a dashed box and connections are indicated by dashed lines, which means that the proxy apparatus and connections are optional.

In addition, preferably, the wireless communication system 1100 may further include a proxy apparatus 1108. The proxy apparatus 1108 corresponds to the device embodiment described above with reference to FIG. 10, and details thereof are not repeated herein. However, it should be understood that the proxy apparatus is optional, and that the secondary system apparatus may access the geographic location database directly, not via the proxy apparatus.

Figure 12:
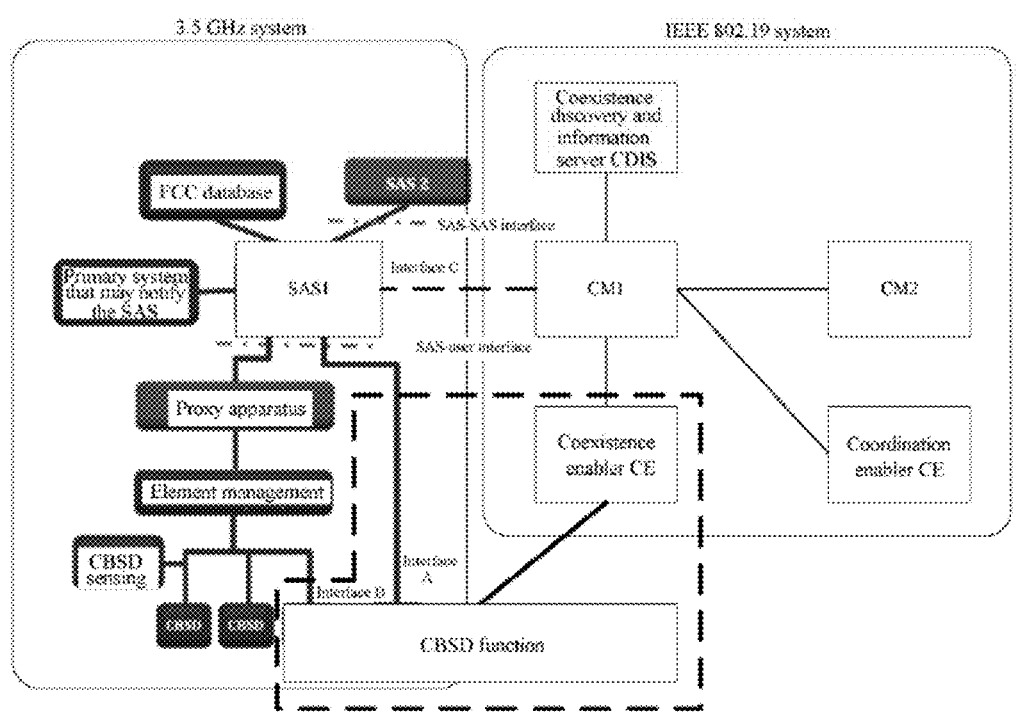
FIG. 12 is a schematic diagram showing an exemplary application scenario according to the present disclosure.

It should be understood that the wireless communication system 1100 herein may correspond to, for example, the combination of the 3.5 GHz system and the 802.19 system described above. In this case, the secondary system apparatus includes a CBSD, the geographic location database includes a SAS, and the spectrum management device may include a CM. The present disclosure is certainly not limited to this application, and is applicable to any secondary system requiring coexistence management and a corresponding spectrum management device. FIG. 12 is a schematic diagram showing an exemplary application scenario of a combination of a 3.5 GHz system and an 802.19 system.

As shown in FIG. 12, this system architecture is applicable to a communication device in the 3.5 GHz frequency band, which may be, for example, a small base station in an LTE system. The portion shown by a thick dashed box in FIG. 12 is an exemplary implementation of the communication device. In order to use the 3.5 GHz frequency band, the communication device is equipped with a function of the CBSD, and interfaces A and B for accessing the geographic location database SAS and the proxy apparatus. The system also subscribes to the IEEE 802.19 service (coexistence management service), by which the coexistence management may be performed on that small base station and small base stations in the vicinity using the same frequency band as that small base station, thus optimizing spectrum utilization efficiency of these small base stations in a certain region. For this reason, the communication device is also equipped with a function of a coexistence enabler (CE) in the IEEE 802.19 system, which enables the communication device to accept the coexistence management of the coexistence manager (CM) in the IEEE 802.19 system. The communication device may transmit available spectrum resources to the spectrum management device (CM) in the IEEE 802.19 system and receive corresponding management information via the CE module, wherein the management information may include, for example, regrouping information, proxy apparatus information, coexistence management configuration information and the like. If allowed by the regulations, the CM in the IEEE 802.19 system (i.e. CM1; another coexistence manager CM2 in the IEEE 802.19 system is also shown in the figure) may also access the geographic location database (SAS) in the 3.5 GHz system via an internal/external interface C to obtain information of the primary system and an available spectrum calculation manner for adjusting grouping of the secondary system apparatuses, thereby optimizing the coexistence management.

It should be noted that the function modules shown in FIG. 12 are merely divided logically, and the actual implementations are not limited thereto. Further, specific implementations of the interfaces A to C described above are not limited, as long as two modules connected via the interface can communicate with each other. In addition, connections between the function modules shown in FIG. 12 merely indicate that these modules can communicate with each other (directly or indirectly), and specific implementations of the connections are not limited, including various forms of wired connections and wireless connections.

It should be understood that the application scenario shown in FIG. 12 is only exemplary but not limitative, and those skilled in the art may adjust the system architecture according to the level of technology, changes of relevant regulations, and the like at the time when the present disclosure is implemented. In addition, it should further be understood that the application scenario of the present disclosure is apparently not limited thereto, and the present disclosure is also applicable to other secondary systems requiring coexistence management and a corresponding spectrum management device.

In order to further facilitate the understanding of the present disclosure, a signaling interaction process among a spectrum management device, a geographic location database, a secondary system apparatus, and a proxy apparatus according to an embodiment of the present disclosure is described below with reference to the flowchart shown in FIG. 13, which is a flowchart showing a signaling interaction process for coexistence management to according to an embodiment of the present disclosure.

Figure 13:
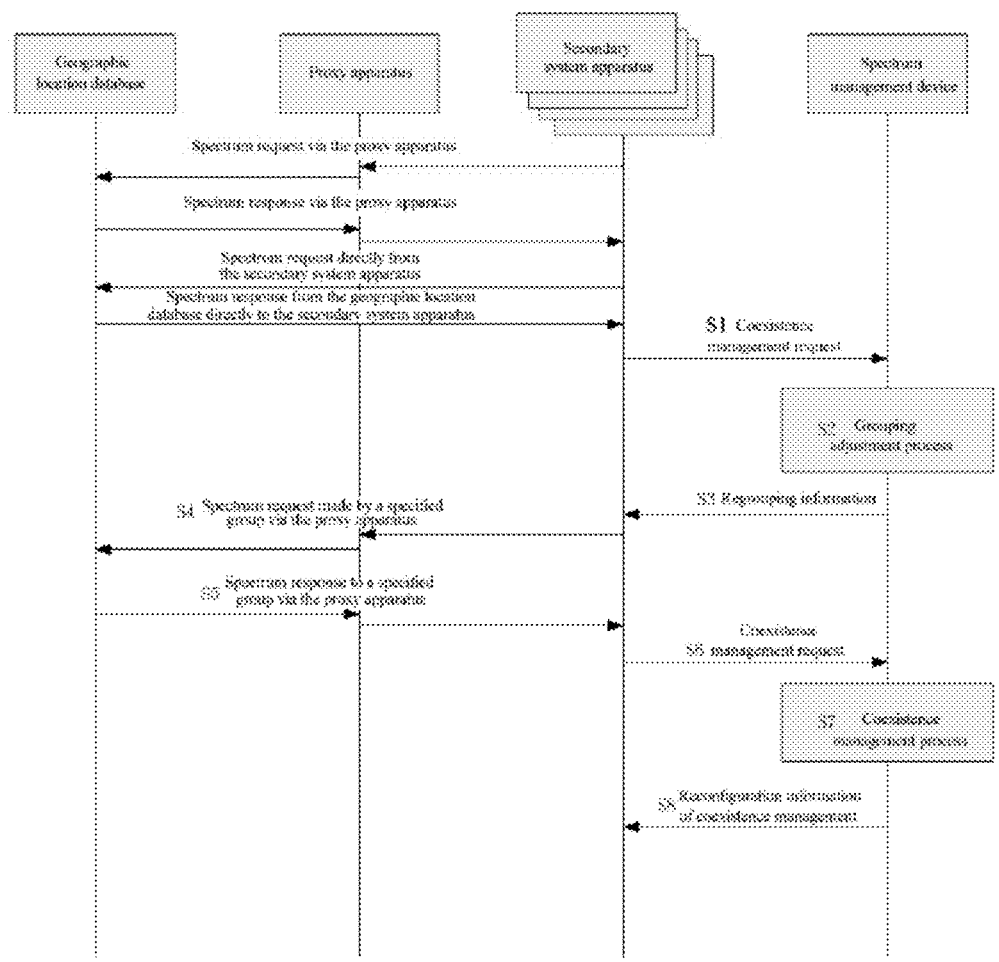
FIG. 13 is a flowchart showing a signaling interaction process for coexistence management according to an embodiment of the present disclosure.

As shown in FIG. 13, firstly, before communication, multiple secondary system apparatuses need to access a geographic location database to obtain available spectrum resources and authorizations. The secondary system apparatuses may access the geographic location database either directly or via a proxy apparatus in groups, and then may obtain a corresponding spectrum response from the geographic location database either directly or via the proxy apparatus. The spectrum response includes available spectrum resources allocated to the secondary system apparatuses. Only a signaling interaction process closely related to the present disclosure is described in detail below.

Firstly, in step S1, the secondary system apparatuses make a coexistence management request to a spectrum management device after obtaining the available spectrum resources. Then, in step S2, the spectrum management device may optimize grouping of the secondary system apparatuses according to the received coexistence management request in the manner as described above, so as to meet a predetermined performance requirement. Next, in step S3, the spectrum management device transmits regrouping information about the optimized grouping to the secondary system apparatuses. Then, in step S4, the secondary system apparatuses access the corresponding proxy apparatus according to the received regrouping information to send a spectrum request. The spectrum request includes a group identifier of the secondary system apparatuses, so that the proxy apparatus may request, in group, the geographic location database for spectrum resources. Next, in step S5, after calculating the available spectrum resources for the secondary system apparatuses, the geographic location database generates a corresponding spectrum response and transmits the spectrum response to the proxy apparatus, which in turn transmits the spectrum response to the secondary system apparatuses. Then, in step S6, after obtaining available spectrum resources that are allocated according to the optimized grouping, the secondary system apparatuses re-request coexistence management from the spectrum management device. In step S7, the spectrum management device performs the coexistence management on the secondary system apparatuses in the conventional manner to optimize spectrum utilization and to reduce interference between the secondary system apparatuses. In step S8, the spectrum management device transmits reconfiguration information of the coexistence management to the secondary system apparatuses, so that the secondary system apparatuses may operate based on the spectrum resources allocated by the spectrum management device.

It should be noted that although the signaling interaction process for coexistence management is described with reference to the flowchart shown in FIG. 13, as can be appreciated, the described signaling interaction process is only exemplary but not limitative. For example, under other application scenarios in which no proxy apparatus is involved or a geographic location database and a spectrum management device are integrated, those skilled in the art may naturally modify the above signaling interaction process adaptively according to the principle of the present disclosure.

Corresponding to the above device embodiments, the following method embodiments are provided in the present disclosure.

Figure 14:
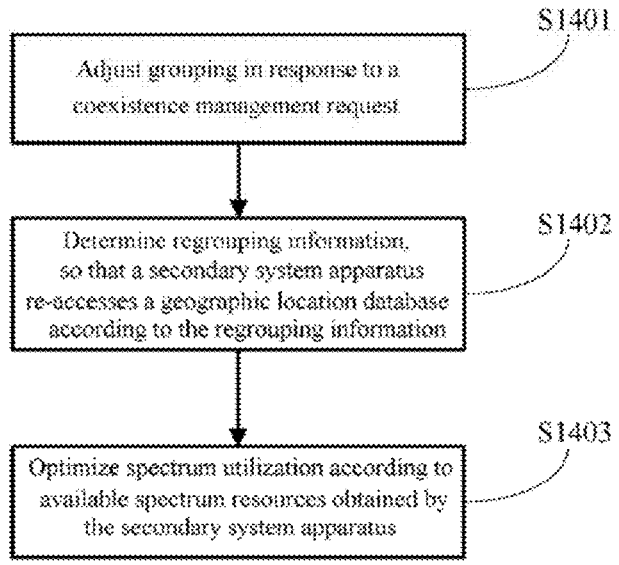
FIG. 14 is a flowchart showing a process example of a spectrum management method according to an embodiment of the present disclosure.

FIG. 14 is a flowchart showing a spectrum management method according to an embodiment of the present disclosure. The method may be performed by, for example, a processor (e.g., a CPU, a DSP, or the like), an integrated circuit, or the like.

As shown in FIG. 14, the method begins at step S1401. In step S1401, in response to a coexistence management request from one or more secondary system apparatuses, current grouping of the one or more secondary system apparatuses is adjusted according to a predetermined performance requirement. The coexistence management request includes at least information about available spectrum resources requested from a geographic location database by the one or more secondary system apparatuses according to the current grouping. For specific implementations of grouping adjustment, one may refer to the description at corresponding positions in the above device embodiments, which are not repeated herein.

Then the method proceeds to step S1402. In step S1402, regrouping information of the one or more secondary system apparatuses is determined according to a result of the grouping adjustment, so that the one or more secondary system apparatuses re-request the geographic location database for available spectrum resources according to the regrouping information.

Next, in step S1403, spectrum utilization of the one or more secondary system apparatuses is optimized according to the available spectrum resources re-requested by the one or more secondary system apparatuses.

Figure 15:
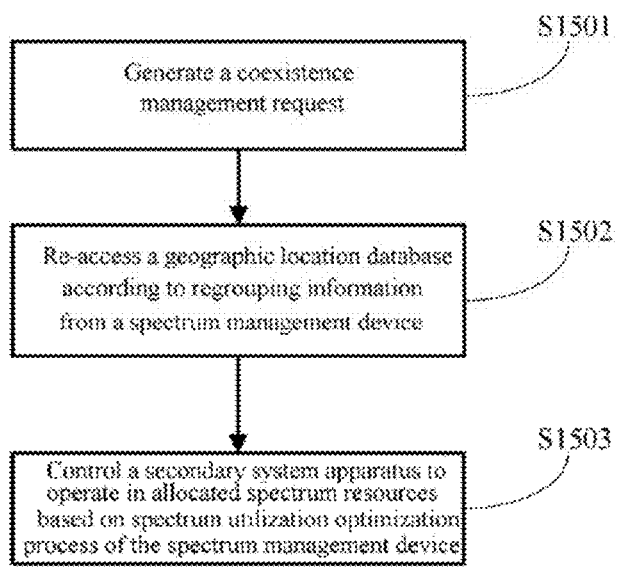
FIG. 15 is a flowchart showing a process example of a method in a secondary system apparatus according to an embodiment of the present disclosure.

FIG. 15 is a flowchart showing a process example of a method in a secondary system apparatus according to an embodiment of the present disclosure. The method may be performed by, for example, a processor (e.g., a CPU, a DSP, or the like), an integrated circuit, or the like.

As shown in FIG. 15, the method begins at step S1501. In step S1501, a coexistence management request to be sent to a spectrum management device is generated. The coexistence management request includes at least information about available spectrum resources that are requested from a geographic location database by the secondary system apparatus according to current grouping.

Then the method proceeds to step S1502. In step S1502, available spectrum resources are re-requested from the geographic location database according to regrouping information from the spectrum management device. The regrouping information is generated by adjusting, according to a predetermined performance requirement, the current grouping of the secondary system apparatus by the spectrum management device in response to the coexistence management request.

Next, in step S1503, based on the spectrum utilization optimization process that is performed by the spectrum management device according to the available spectrum resources re-requested by the secondary system apparatus, the secondary system apparatus is controlled to operate in allocated spectrum resources.

Figure 16:
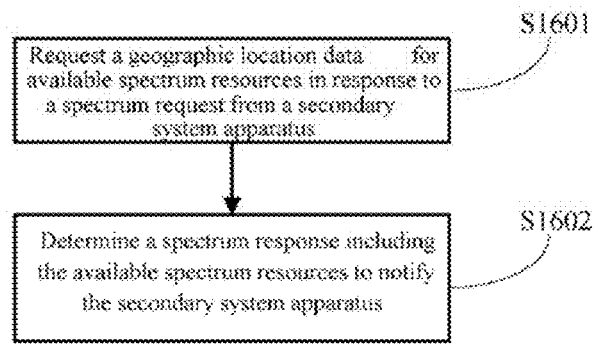
FIG. 16 is a flowchart showing a process example of a method in a proxy apparatus according to an embodiment of the present disclosure.

FIG. 16 is a flowchart showing a process example of a method in a proxy apparatus according to an embodiment of the present disclosure. The method may be performed by, for example, a processor (e.g., a CPU, a DSP, or the like), an integrated circuit, or the like.

As shown in FIG. 16, the method begins at step S1601. In step S1601, in response to a spectrum request from one or more secondary system apparatuses, available spectrum resources for the one or more secondary system apparatuses are re-requested from a geographic location database in groups. The one or more secondary system apparatuses are re-grouped by a spectrum management device according to a predetermined performance requirement and coexistence management requests from the one or more secondary system apparatuses. The coexistence management requests include at least information about available spectrum resources that are requested from the geographic location database by the one or more secondary system apparatuses according to current grouping. The spectrum request may include a group identifier of the re-grouped one or more secondary system apparatuses, and may further include geographic location information of the secondary system apparatuses.

It should be understood that the method embodiments described herein with reference to FIG. 14 to FIG. 16 correspond to the device embodiments described above with reference to FIG. 5, FIG. 9, and FIG. 10, respectively, and thus for the contents not described in detail herein, one may refer to the above description at corresponding positions, which are not repeated herein.

In addition, it should be noted that although the process examples of the methods according to the embodiments of the present disclosure are described above, the process examples are only exemplary but not limitative. Those skilled in the art may modify the above embodiments according to the principle of the present disclosure, for example, adding, deleting, or combining the steps in the above embodiments, and all of such modifications fall within the scope of the present disclosure.

It should be understood that the machine-executable instructions in a storage medium and a program product according to an embodiment of the present disclosure may be configured to perform a method corresponding to the above device embodiment, and thus for the contents not described in detail herein, one may refer to the above description at corresponding positions, which are not repeated herein.

Accordingly a storage medium for carrying the above-described program product storing the machine-executable instructions is also included in the present disclosure. The storage medium includes, but not limited to, a floppy disk, an optical disk, a magneto-optical disk, a storage card, a memory stick or the like.

Figure 17:
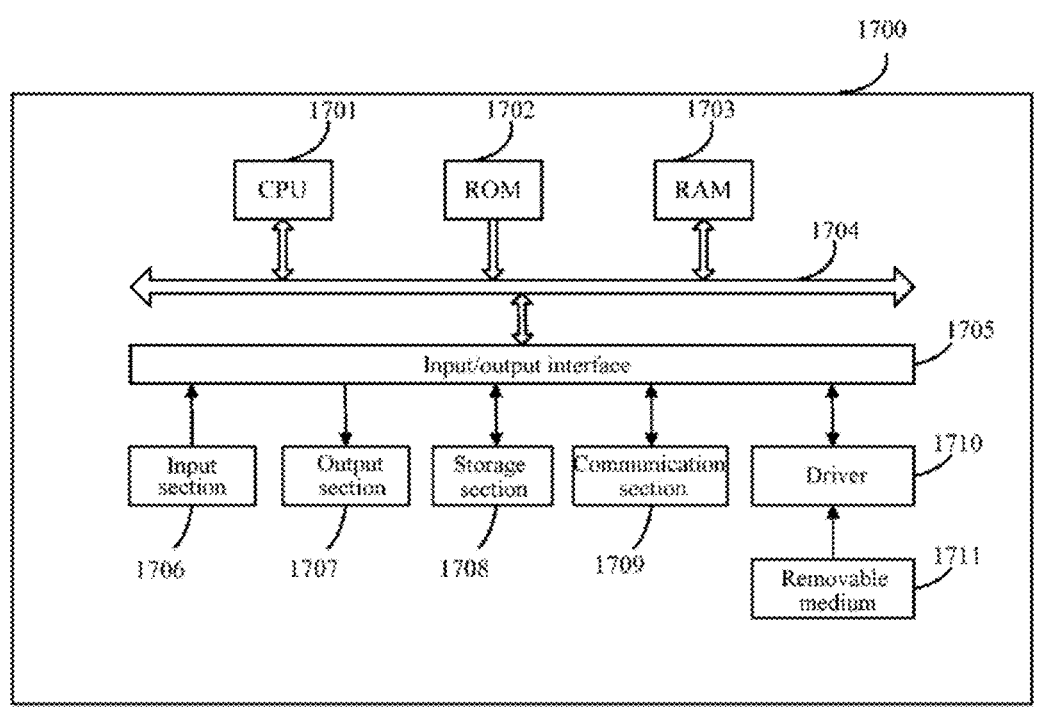
FIG. 17 is a block diagram showing an exemplary structure of a personal computer as an information processing apparatus that can be employed in an embodiment of the present disclosure.

In addition, it should further be noted that the series of process and the devices described above may also be implemented by software and/or firmware. In a case where they are implemented by software and/or firmware, a program constituting the software is installed from a storage medium or a network to a computer having a dedicated hardware structure, for example, a general-purpose personal computer 1700 shown in FIG. 17, wherein the computer may perform various functions when being installed with various programs. FIG. 17 is a block diagram showing an exemplary structure of a personal computer as an information processing apparatus that can be employed in an embodiment of the present disclosure.

In FIG. 17, a central processing unit (CPU) 1701 performs various types of process according to programs stored in a read only memory (ROM) 1702 or programs loaded from a storage section 1708 to a random access memory (RAM) 1703. Data required when the CPU 1701 performs various types of process is stored in the RAM 1703 as needed.

The CPU 1701, the ROM 1702 and the RAM 1703 are connected to each other via a bus 1704. An input/output interface 1705 is also connected to the bus 1704.

The following components are connected to the input/output interface 1705: an input section 1706 including a keyboard, a mouse or the like; an output section 1707 including a display such as a cathode ray tube (CRT), a liquid crystal display (LCD) and the like, a speaker, and the like; a storage section 1708 including a hard disk or the like; and a communication section 1709 including a network interface card such as a LAN card, a modem or the like. The communication section 1709 performs communication process via a network such as the Internet.

A driver 1710 may also be connected to the input/output interface 1705 as needed. A removable medium 1711 such as a magnetic disk, an optical disk, a magneto-optical disk and a semiconductor memory may be installed on the driver 1710 as needed, such that the computer programs read from the removable medium 1711 are installed in the storage section 1708 as needed.

In a case that the series of process described above is implemented by software, programs constituting the software are installed from a network such as the Internet or a storage medium such as the removable medium 1711.

Those skilled in the art should understand that the storage medium is not limited to the removable medium 1711 shown in FIG. 17 in which programs are stored and which is distributed separately from the apparatus to provide the programs to the user. An example of the removable medium 1711 includes: a magnetic disk (including a floppy disk (registered trademark)), an optical disk (including a compact disk read only memory (CD-ROM) and a digital versatile disk (DVD)), a magneto-optical disk (including a mini-disk (MD) (registered trademark)) and a semiconductor memory. Alternatively the storage medium may be the ROM 1702, a hard disk included in the storage section 1708 or the like, which have the programs stored therein and are distributed to the user together with the device including them.

The technology of the present disclosure may be applied to various products including a base station and a user equipment. Specifically, the base station may be implemented as an evolved Node B (eNB) of any type, such as a macro eNB and a small eNB. The small eNB may be an eNB covering a cell smaller than a macro cell, for example, a pico eNB, a micro eNB or a home (femto) eNB. Alternatively, the base station may be implemented as a base station of any other type, such as a NodeB and a base transceiver station (BTS). The base station may include: a main body (also referred to as a base station apparatus) configured to control wireless communication; and one or more remote radio heads (RRH) arranged at locations different from that of the main body. In addition, terminals of various types as described below may operate as a base station by performing functions of the base station temporarily or in a semi-persistent manner.

The user equipment may be implemented as mobile terminals (such as a smart phone, a tablet personal computer (PC), a notebook PC, a portable game terminal, a portable/dangle mobile router and a digital camera) or an in-vehicle terminal (such as a vehicle navigation apparatus). The user equipment may also he implemented as a terminal (also referred to as a machine type communication (MTC) terminal) that performs machine-to-machine (M2M) communications. In addition the user equipment may he a wireless communication module (such as an integrated circuit module including a single wafer) installed on each of the above terminals.

Application examples according to the present disclosure are described below with reference to FIGS. 18 to 21.

Application Example for Base Station

First Application Example

Figure 18:
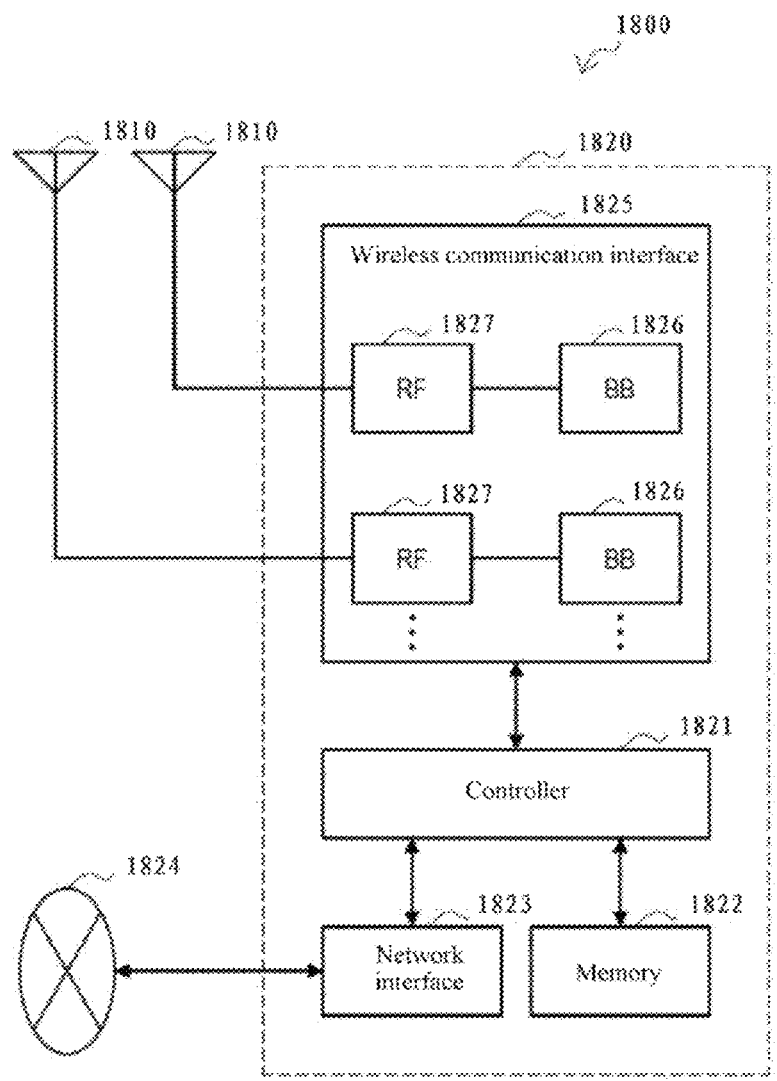
FIG. 18 is a block diagram showing a first example of the schematic configuration of an Evolved Node Base Station (eNB) to which the technology of the present disclosure may be applied.

FIG. 18 is a block diagram showing a first example of the schematic configuration of an eNB to which the technology of the present disclosure may be applied. An eNB 1800 includes one or more antennas 1810 and a base station apparatus 1820. The base station apparatus 1820 and each antenna 1810 may he connected to each other via an RF cable.

Each of the antennas 1810 includes a single or multiple antenna elements (such as multiple antenna elements included in a multi-input multi-output (MIMO) antenna), and is used for the base station apparatus 1820 to transmit and receive wireless signals. As shown in FIG. 18, the eNB 1800 may include multiple antennas 1810. For example, the multiple antennas 1810 may be compatible with multiple frequency bands used by the eNB 1800. Although FIG. 18 shows the example in which the eNB 1800 includes the multiple antennas 1810, the eNB 1800 may also include a single antenna 1810.

The base station apparatus 1820 includes a controller 1821, a memory 1822, a network interface 1823, and a wireless communication interface 1825.

The controller 1821 may be, for example, a CPU or a DSP, and may operate various functions of upper layers of the base station apparatus 1820. For example, the controller 1821 generates data packets from data in signals processed by the wireless communication interface 1825, and transfers the generated packets via the network interface 1823. The controller 1821 may bundle data from multiple base band processors to generate bundled packets and transfer the generated bundled packets. The controller 1821 may have logical functions of performing control such as radio resource control, radio bearer control, mobility management, admission control and scheduling. The control may be performed in corporation with a node of a core network or an eNB in the vicinity. The memory 1822 includes a RAM and a ROM and stores programs executed by the controller 1821 and various types of control data (such as a list of terminals, data of transmission power, and scheduling data).

The network interface 1823 is a communication interface for connecting the base station apparatus 1820 to a core network 1824. The controller 1821 may communicate with a node of the core network or another eNB via the network interface 1823. In this case, the eNB 1800 and the node of the core network or the other eNB may be connected to each other via a logical interface (such as an S1 interface and an X2 interface). The network interface 1823 may also be a wired communication interface or a wireless communication interface for wireless backhaul. If the network interface 1823 is a wireless communication interface, it may use a higher frequency band for wireless communication than a frequency band used by the wireless communication interface 1825.

The wireless communication interface 1825 supports any cellular communication scheme (such as Long Term Evolution (LIE) and LTE-Advanced), and provides wireless connection to a terminal located in a cell of the eNB 1800 via the antenna 1810. The wireless communication interface 1825 may typically include, for example, a baseband (BB) processor 1826 and an RF circuit 1827. The BB processor 1826 may perform, for example, encoding/decoding, modulating/demodulating, and multiplexing/demultiplexing, and performs various types of signal processing of layers (such as L1, medium access control (MAC), radio link control (RLC), and packet data convergence protocol (PDCP) layers). The BB processor 1826 may have a part or all of the above-described logical functions instead of the controller 1821. The BB processor 1826 may be a memory that stores a communication control program, or a module that includes a processor and related circuits configured to execute the program. Updating the program may allow the functions of the BB processor 1826 to be changed. The module may be a card or a blade that is inserted into a slot of the base station apparatus 1820. Alternatively, the module may also be a chip that is mounted on the card or the blade. Further, the RF circuit 1827 may include, for example, a mixer, a filter, and an amplifier, and may transmit and receive wireless signals via the antenna 1810.

As shown in FIG. 18, the wireless communication interface 1825 may include multiple BB processors 1826. For example, the multiple BB processors 1826 may be compatible with multiple frequency bands used by the eNB 1800. As shown in FIG. 18, the wireless communication interface

1825 may include multiple RF circuits 1827. For example, the multiple RF circuits 1827 may be compatible with multiple antenna elements. Although FIG. 18 shows the example in which the wireless communication interface 1825 includes the multiple BB processors 1826 and the multiple RF circuits 1827, the wireless communication interface 1825 may also include a single BB processor 1826 or a single RF circuit 1827.

Second Application Example

Figure 19:
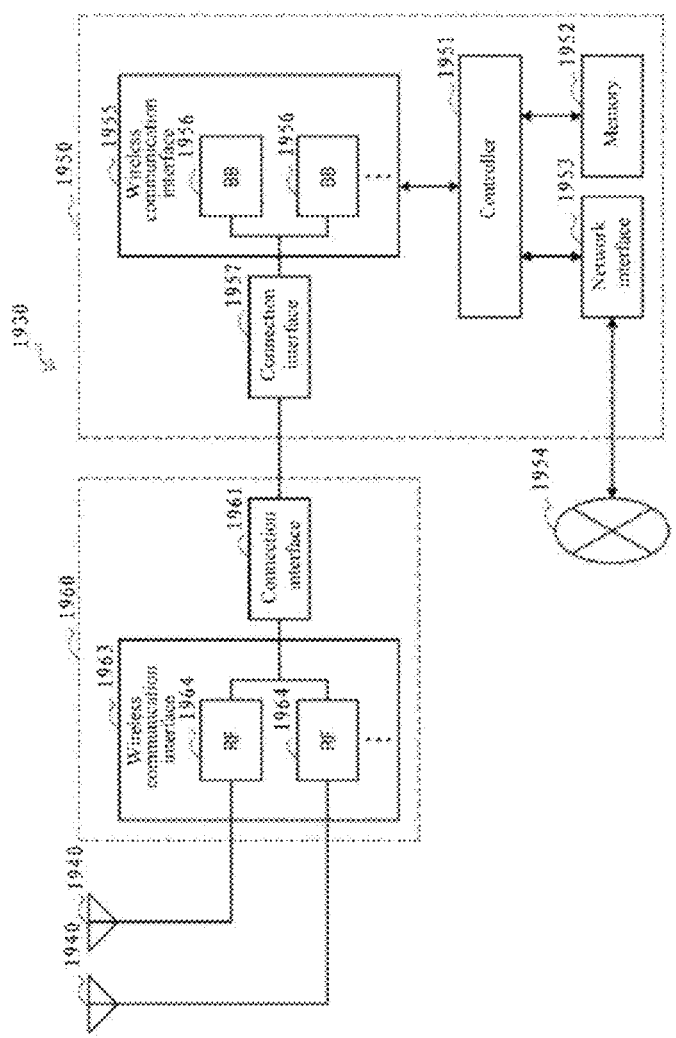
FIG. 19 is a block diagram showing a second example of the schematic configuration of an eNB to which the technology of the present disclosure may be applied.

FIG. 19 is a block diagram showing a second example of the schematic configuration of an eNB to which the technology of the present disclosure may be applied. An eNB 1930 includes one or more antennas 1940, a base station apparatus 1950, and an RRH 1960. The RRH 1960 and each antenna 1940 may be connected to each other via an RF cable. The base station apparatus 1950 and the RRH 1960 may be connected to each other via a high speed line such as an optical fiber cable.

Each of the antennas 1940 includes a single or multiple antenna elements (such as multiple antenna elements included in an MIMO antenna), and is used for the RRH 1960 to transmit and receive wireless signals. As shown in FIG. 19, the eNB 1930 may include multiple antennas 1940. For example, the multiple antennas 1940 may be compatible with multiple frequency bands used by the eNB 1930. Although FIG. 19 shows the example in which the eNB 1930 includes the multiple antennas 1940, the eNB 1930 may also include a single antenna 1940.

The base station apparatus 1950 includes a controller 1951, a memory 1952, a network interface 1953, a wireless communication interface 1955, and a connection interface 1957. The controller 1951, the memory 1952, and the network interface 1953 are the same as the controller 1821, the memory 1822, and the network interface 1823 described with reference to FIG. 18.

The wireless communication interface 1955 supports any cellular communication scheme (such as LIE and LIE-Advanced), and provides wireless communication to a terminal located in a sector corresponding to the RRH 1960 via the RRH 1960 and the antenna 1940. The wireless communication interface 1955 may typically include, for example, a BB processor 1956. The BB processor 1956 is the same as the BB processor 1826 described with reference to FIG. 18, except that the BB processor 1956 is connected to an RF circuit 1964 of the RRH 1960 via the connection interface 1957. As shown in FIG. 19, the wireless communication interface 1955 may include multiple BB processors 1956. For example, the multiple BB processors 1956 may be compatible with multiple frequency bands used by the eNB 1930. Although FIG. 19 shows the example in which the wireless communication interface 1955 includes the multiple BB processors 1956, the wireless communication interface 1955 may also include a single BB processor 1956.

The connection interface 1957 is an interface for connecting the base station apparatus 1950 (wireless communication interface 1955) to the RRH 1960. The connection interface 1957 may also be a communication module for communication in the above-described high speed line that connects the base station apparatus 1950 (wireless communication interface 1955) to the RRH 1960.

The RRH 1960 includes a connection interface 1961 and a wireless communication interface 1963.

The connection interface 1961 is an interface for connecting the RRH 1960 (wireless communication interface 1963) to the base station apparatus 1950. The connection interface 1961 may also be a communication module for communication in the above-described high speed line.

The wireless communication interface 1963 transmits and receives wireless signals via the antenna 1940. The wireless communication interface 1963 may typically include, for example, the RF circuit 1964. The RF circuit 1964 may include, for example, a mixer, a filter, and an amplifier, and may transmit and receive wireless signals via the antenna 1940. As shown in FIG. 19, the wireless communication interface 1963 may include multiple RF circuits 1964. For example, the multiple RF circuits 1964 may support multiple antenna elements. Although FIG. 19 shows the example in which the wireless communication interface 1963 includes the multiple RF circuits 1964, the wireless communication interface 1963 may also include a single RF circuit 1964.

In the eNB 1800 and the eNB 1930 shown in FIG. 18 and FIG. 19, the communication unit in the device 900 may be implemented by the wireless communication interface 1825 and the wireless communication interface 1955 and/or the wireless communication interface 1963. Also, at least a part of the functions of the coexistence management requesting unit 902, the available spectrum requesting unit 904, and the control unit 906 may be implemented by the controller 1821 and the controller 1951.

Application Example for User Equipment

First Application Example

Figure 20:
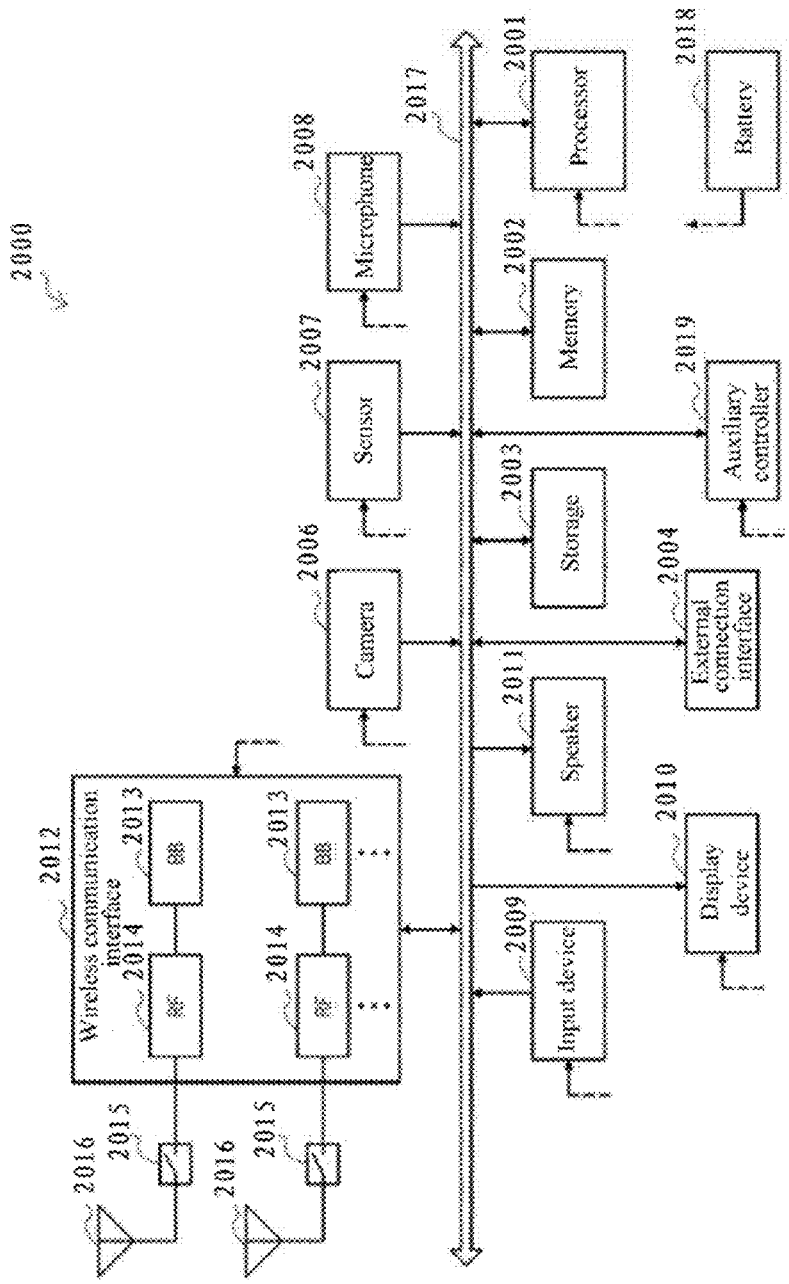
FIG. 20 is a block diagram showing an example of the schematic configuration of a smart phone to which the technology of the present disclosure may be applied.

FIG. 20 is a block diagram showing an example of the schematic configuration of a smart phone 2000 to which the technology of the present disclosure may be applied. The smart phone 2000 includes a processor 2001, a memory 2002, a storage 2003, an external connection interface 2004, a camera 2006, a sensor 2007, a microphone 2008, an input device 2009, a display device 2010, a speaker 2011, a wireless communication interface 2012, one or more antenna switches 2015, one or more antennas 2016, a bus 2017, a battery 2018, and an auxiliary controller 2019.

The processor 2001 may be, for example, a CPU or a system on a chip (SoC), and may control functions of an application layer and other layers of the smart phone 2000. The memory 2002 includes a RAM and a ROM, and stores programs executed by the processor 2001 and data. The storage 2003 may include a storage medium such as a semiconductor memory and a hard disk. The external connection interface 2004 is an interface for connecting an external device (such as a memory card and a universal serial bus (USB) device) to the smart phone 2000.

The camera 2006 includes an it sensor (such as a charge coupled device (CCD) and a complementary metal oxide semiconductor (CMOS)), and generates a captured image. The sensor 2007 may include a group of sensors such as a measurement sensor, a gyro sensor, a geomagnetic sensor, and an acceleration sensor. The microphone 2008 converts sounds that are input to the smart phone 2000 to audio signals. The input device 2009 includes, for example, a touch sensor configured to detect a touch on a screen of the display device 2010, a keypad, a keyboard, a button, or a switch, and receives an operation or information input from a user. The display device 2010 includes a screen (such as a liquid crystal display (LCD) and an organic light-emitting diode (OLED) display), and displays an output image of the smart phone 2000. The speaker 2011 converts audio signals that are output from the smart phone 2000 to sounds.

The wireless communication interface 2012 supports any cellular communication scheme (such as LTE and LTE-Advanced), and performs wireless communication. The wireless communication interface 2012 may typically include, for example, a BB processor 2013 and a RF circuit 2014. The BB processor 2013 may perform, for example, encoding/decoding, modulating/demodulating, and multiplexing/demultiplexing, and may perform various types of signal processing for wireless communication. Further, the RF circuit 2014 may include, for example, a mixer, a filter, and an amplifier, and may transmit and receive wireless signals via the antenna 2016. The wireless communication interface 2012 may be a chip module having the BB processor 2013 and the RF circuit 2014 integrated thereon. As shown in FIG. 20, the wireless communication interface 2012 may include multiple BB processors 2013 and multiple RF circuits 2014. Although FIG. 20 shows the example in which the wireless communication interface 2012 includes the multiple BB processors 2013 and the multiple RF circuits 2014, the wireless communication interface 2012 may also include a single BB processor 2013 or a single RF circuit 2014.

Furthermore, in addition to a cellular communication scheme, the wireless communication interface 2012 may support other types of wireless communication schemes such as a short-distance wireless communication scheme, a near field communication scheme, and a wireless local area network (LAN) scheme. In this case, the wireless communication interface 2012 may include the BB processor 2013 and the RF circuit 2014 for each wireless communication scheme.

Each of the antenna switches 2015 switches connection destinations of the antenna 2016 among multiple circuits (such as circuits for different wireless communication schemes) included in the wireless communication interface 2012.

Each of the antennas 2016 includes a single or multiple antenna elements (such as multiple antenna elements included in an MIMO antenna), and is used for the wireless communication interface 2012 to transmit and receive wireless signals. As shown in FIG. 20 the smart phone 2000 may include multiple antennas 2016. Although FIG. 20 shows the example in which the smart phone 2000 includes the multiple antennas 2016, the smart phone 2000 may also include a single antenna 2016.

Furthermore, the smart phone 2000 may include the antenna 2016 for each wireless communication scheme. In this case, the antenna switches 2015 may be omitted from the configuration of the smart phone 2000.

The bus 2017 connects the processor 2001, the memory 2002, the storage 2003, the external connection interface 2004, the camera 2006, the sensor 2007, the microphone 2008, the input device 2009, the display device 2010, the speaker 2011, the wireless communication interface 2012, and the auxiliary controller 2019 to each other. The battery 2018 supplies power to blocks of the smart phone 2000 shown in FIG. 20 via feeder lines, which me partially shown as dashed lines in FIG. 20. The auxiliary controller 2019 operates the minimum necessary function(s) of the smart phone 2000, for example, in a sleep mode.

In the smart phone 2000 shown in FIG. 20, the communication unit in the device 900 may be implemented by the wireless communication interface 2012. Also, at least a part of the functions of the coexistence management requesting unit 902, the available spectrum requesting unit 904, and the control unit 906 may be implemented by the processor 2001 or the auxiliary controller 2019.

Second Application Example

Figure 21:
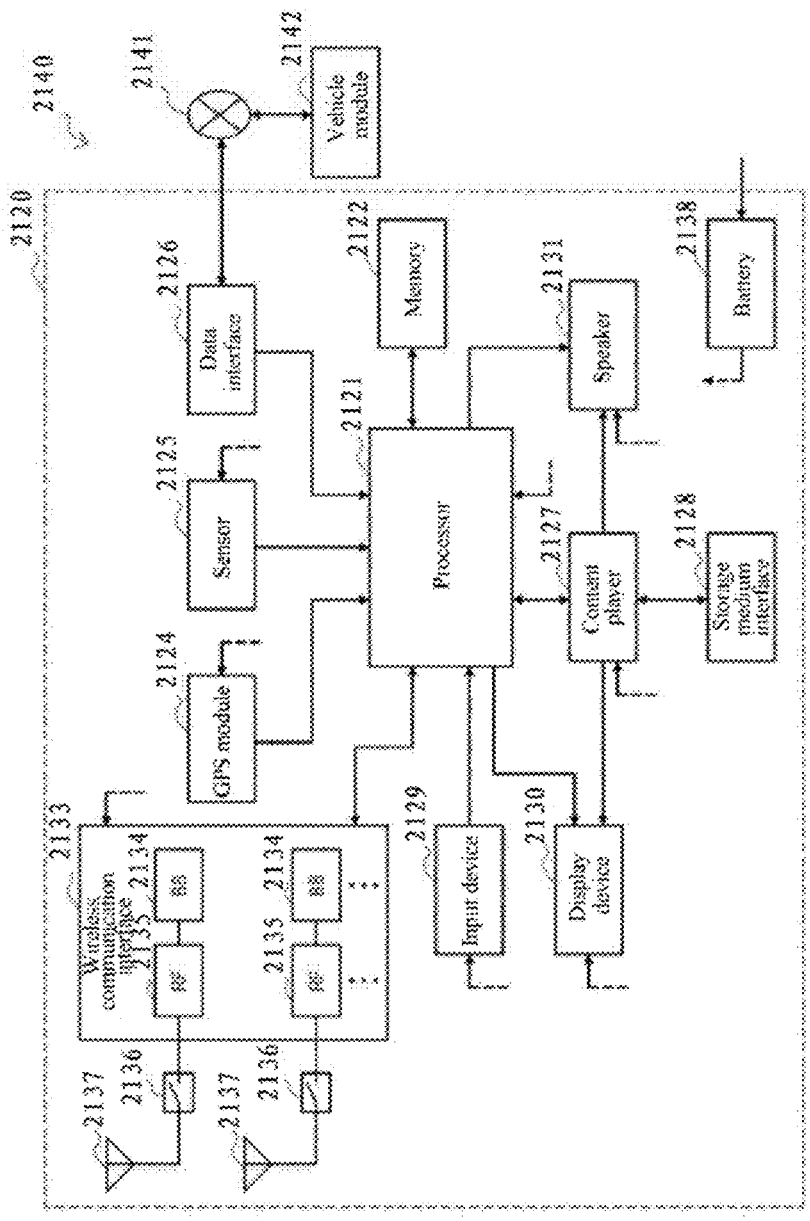
FIG. 21 is a block diagram showing an example of the schematic configuration of a vehicle navigation apparatus to which the technology of the present disclosure may be applied.

FIG. 21 is a block diagram showing an example of the schematic configuration of a vehicle navigation apparatus 2120 to which the technology of the present disclosure may be applied. The vehicle navigation apparatus 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be, for example, a CPU or a SoC, and may control a navigation function and other functions of the vehicle navigation apparatus 2120. The memory 2122 includes a RAM and a ROM, and stores programs executed by the processor 2121 and data.

The GPS module 2124 measures a position (such as the latitude, longitude, and altitude) of the vehicle navigation apparatus 2120 by using GPS signals received from a GPS satellite. The sensor 2125 may include a group of sensors such as a gyro sensor, a geomagnetic sensor, and an air pressure sensor. The data interface 2126 is connected to, for example, an in-vehicle network 2141 via a terminal that is not shown, and acquires data (such as vehicle speed data) generated by the vehicle.

The content player 2127 reproduces content stored in a storage medium (such as a CD and a DVD) that is inserted into the storage medium interface 2128. The input device 2129 includes, for example, a touch sensor configured to detect a touch on a screen of the display device 2130, a button or a switch, and receives an operation or information input flour a user. The display device 2130 includes a screen such as an LCD or an OLED display, and displays an image of the navigation function or content that is reproduced. The speaker 2131 outputs sounds of the navigation function or the content that is reproduced.

The wireless communication interface 2133 supports any cellular communication scheme (such as LTE and LTE-Advanced), and performs wireless communication. The wireless communication interface 2133 may typically include, for example, a BB processor 2134 and an RF circuit 2135. The BB processor 2134 may perform, for example, encoding/decoding, modulating/demodulating, and multiplexing/demultiplexing, and may perform various types of signal processing for wireless communication. Further, the RF circuit 2135 may include, for example, a mixer, a filter, and an amplifier, and may transmit and receive wireless signals via the antenna 2137. The wireless communication interface 2133 may also be a chip module having the BB processor 2134 and the BY circuit 2135 integrated to thereon. As shown in FIG. 21, the wireless communication interface 2133 may include multiple BB processors 2134 and multiple RF circuits 2135. Although FIG. 21 shows the example in which the wireless communication interface 2133 includes the multiple BB processors 2134 and the multiple RF circuits 2135, the wireless communication interface 2133 may also include a single BB processor 2134 or a single RF circuit 2135.

Furthermore, in addition to the cellular communication scheme, the wireless communication interface 2133 may support other types of wireless communication schemes such as a short-distance wireless communication scheme, a near field communication scheme, and a wireless LAN scheme. In this case, the wireless communication interface 2133 may include the BB processor 2134 and the RF circuit 2135 for each wireless communication scheme.

Each of the antenna switches 2136 switches connection destinations of the antennas 2137 among multiple circuits (such as circuits for different wireless communication schemes) included in the wireless communication interface 2133.

Each of the antennas 2137 includes a single or multiple antenna elements (such as multiple antenna elements included in an MIMO antenna), and is used for the wireless communication interface 2133 to transmit and receive wireless signals. As shown in FIG. 21, the vehicle navigation apparatus 2120 may include multiple antennas 2137. Although FIG. 21 shows the example in which the vehicle navigation apparatus 2120 includes the multiple antennas 2137, the vehicle navigation apparatus 2120 may also include a single antenna 2137.

Furthermore, the vehicle navigation apparatus 2120 may include the antenna 2137 for each wireless communication scheme. In this case, the antenna switches 2136 may be omitted from the configuration of the vehicle navigation apparatus 2120.

The battery 2138 supplies power to blocks of the vehicle navigation apparatus 2120 shown in FIG. 21 via feeder lines, which are partially shown as dashed lines in FIG. 21. The battery 2138 accumulates power supplied from the vehicle.

In the vehicle navigation apparatus 2120 shown in FIG. 21, the communication unit in the device 900 may be implemented by the wireless communication interface 2133. Also, at least a part of the functions of the coexistence management requesting unit 902, the available spectrum requesting unit 904, and the control unit 906 may be implemented by the processor 2121.

The technology of the present disclosure may also be implemented as an in-vehicle system (or a vehicle) 2140 including one or more blocks of a vehicle module 2142, the vehicle navigation apparatus 2120, and the in-vehicle network 2141. The vehicle module 2142 generates vehicle data (such as a vehicle speed, an engine speed and failure information), and outputs the generated data to the in-vehicle network 2141.

Although the preferred embodiments of the present disclosure have been described above with reference to the drawings, the present disclosure is certainly not limited to the above examples. Those skilled in the art may make various changes and modifications within the scope of the appended claims, and it should he understood that these changes and modifications naturally within the technical scope of the present disclosure.

For example, multiple functions included in one unit in the above embodiments may be implemented by separate devices. Alternatively, multiple functions implemented by multiple units in the above embodiments may be respectively implemented by separate devices. In addition, one of the above functions may be implemented by multiple units. Such configuration is certainly included in the technical scope of the present disclosure.

In this specification, the steps described in the flowcharts include not only the process performed chronologically in the order described, but also the process performed in parallel or individually but not necessarily chronologically. In addition, even in the steps processed chronologically, the order may certainly be appropriately changed.

Although the present disclosure and the advantages thereof have been described in details, it shall be appreciated that various modifications, substitutions and variations can be made without departing from the spirit and scope of the present disclosure as defined by the appended claims. Furthermore, the terms "comprising", "including" or any other variant thereof in the embodiments of the present disclosure are intended to encompass non-exclusive inclusion, so that processes, methods, articles, or devices that include a series of elements include not only those elements, but also other elements that are not explicitly listed, or elements that are inherent to such processes, methods, articles, or devices. In the absence of further restrictions, for the elements defined by the sentence "including a . . . ", it is not excluded that additional same elements are also included in the process, method, article, or device that includes the elements.

The invention claimed is:

1. A spectrum management device comprising:
a memory configured to store a predetermined spectrum resource calculation manner and a processor configured to:
adjust, in response to a coexistence management request from each of a plurality of secondary system apparatuses and according to primary system interference reference point information corresponding to the plurality of secondary system apparatuses, current grouping of the plurality of secondary system apparatuses according to a predetermined performance requirement, wherein the coexistence management request comprises at least information about available spectrum resources requested from a geographic location database by each of the plurality of secondary system apparatuses according to the current grouping;
determine regrouping information of the plurality of secondary system apparatuses, so that the plurality of secondary system apparatuses re-request the geographic location database for available spectrum resources according to the regrouping information;
optimize, according to the available spectrum resources re-requested by the plurality of secondary system apparatuses, spectrum utilization of the plurality of secondary system apparatuses;
wherein the primary system interference reference point information is comprised in the coexistence management requests of the plurality of secondary system apparatuses or is directly obtained from the geographic location database; and
wherein the processor is further configured to calculate, according to the primary system interference reference point information, available spectrum resources for the plurality of secondary system apparatuses utilizing the predetermined spectrum resource calculation manner, and adjust, according to the calculated available spectrum resources and the predetermined performance request, the current grouping of the plurality of secondary system apparatuses.

2. The spectrum management device according to claim 1, wherein the coexistence management request further comprises one or more of geographic location information, spectrum requirement information and mobility information of the one or more secondary system apparatuses, and
wherein the processor is further configured to adjust, according to at least one of the geographic location information, the spectrum requirement information and the mobility information of the plurality of secondary system apparatuses, the current grouping of the one or more secondary system apparatuses.

3. The spectrum management device according to claim 2, wherein the processor is further configured to determine, according to the spectrum requirement information, an order in which adjusted groups of the plurality of secondary system apparatuses access the geographic location database.

4. The spectrum management device according to claim 1, wherein the processor is further configured to calculate, according to the primary system interference reference point information, available spectrum resources for the plurality of secondary system apparatuses utilizing a predetermined spectrum resource calculation manner obtained from the geographic location database, and adjust, according to the calculated available spectrum resources and the predetermined performance request, the current grouping of the plurality of secondary system apparatuses.

5. The spectrum management device according to claim 1, wherein the regrouping information comprises one or more of a group identifier and a group spectrum request start time and period of the plurality of secondary system apparatuses.

6. The spectrum management device according to claim 1, wherein the regrouping information further comprises proxy apparatus information corresponding to the plurality of secondary system apparatuses, so that secondary system apparatuses in a same group request the geographic location database for the available spectrum resources via a same proxy apparatus in group.

7. The spectrum management device according to claim 1, wherein the processor is further configured to coordinate, according to information about secondary system apparatuses managed by other spectrum management device and proxy apparatus information from the other spectrum management device, grouping of the plurality of secondary system apparatuses and the secondary system apparatuses managed by the other spectrum management device with the other spectrum management device, so that secondary system apparatuses in a same group request the geographic location database for the available spectrum resources via a same proxy apparatus in group.

8. The spectrum management device according to claim 1, wherein the regrouping information is comprised in a reconfiguration command.

9. An electronic device in a secondary system apparatus, the electronic device comprising:
a processor configured to:
generate a coexistence management request to be sent to a spectrum management device, the coexistence management request comprising primary system interference reference point information corresponding to the secondary system apparatus, information about available spectrum resources requested from a geographic location database by the secondary system apparatus according to current grouping, geographic location information, spectrum requirement information and mobility information of the secondary system apparatus, wherein the request is based on an order in which the secondary system apparatus accesses the geographic location database as determined by the spectrum management device according to the spectrum requirement information, the geographic location database for the available spectrum resources;
re-request, according to regrouping information from the spectrum management device, the geographic location database for available spectrum resources, the regrouping information being generated by adjusting the current grouping of the secondary system apparatus by the spectrum management device in response to the coexistence management request according to a predetermined performance requirement, wherein the regrouping information comprises one or more of a group identifier and a group spectrum request start time and period of the secondary system apparatus; and
control, based on spectrum utilization optimization process performed by the spectrum management device according to the available spectrum resources re-requested by the secondary system apparatus, the secondary system apparatus to operate in allocated spectrum resources.

10. The electronic device according to claim 9, wherein the regrouping information further comprises proxy apparatus information corresponding to the secondary system apparatus, and the processor is further configured to make a spectrum request to a corresponding proxy apparatus according to the proxy apparatus information so as to re-request the geographic location database for the available spectrum resources via the corresponding proxy apparatus in group.

11. The electronic device according to claim 10, wherein the spectrum request comprises a group identifier and geographic location information of the secondary system apparatus.

12. A wireless communication system comprising:
a geographic location database;
a plurality of secondary system apparatuses, each of the plurality of secondary system apparatuses comprising a first processor configured to:
generate a coexistence management request to be sent to a spectrum management device, the coexistence management request comprising primary system interference reference point information corresponding to the secondary system apparatus, information about available spectrum resources requested from the geographic location database by the one or more secondary system apparatuses according to current grouping, geographic location information, spectrum requirement information and mobility information of the secondary system apparatus, wherein the request is based on an order in which the secondary system apparatus accesses the geographic location database as determined by the spectrum management device according to the spectrum requirement information, the geographic location database for the available spectrum resources,
re-request, according to regrouping information from the spectrum management device, the geographic location database for available spectrum resources, and
operate in allocated spectrum resources based on spectrum utilization optimization process performed by the spectrum management device according to the available spectrum resources re-requested by the one or more secondary system apparatuses; and
the spectrum management device comprising a memory configured to store a predetermined spectrum resource calculation manner and a second processor configured to:
adjust, in response to the coexistence management request, the current grouping of the one or more secondary system apparatuses according to primary system interference reference point information corresponding to the plurality of secondary system apparatuses and according to a predetermined performance requirement,
determine, according to a result of the adjustment, the regrouping information of the plurality of secondary system apparatuses, and optimize, according to the available spectrum resources re-requested by the plurality of secondary system apparatuses, spectrum utilization of the plurality of secondary system apparatuses wherein the primary system interference reference point information is comprised in the coexistence management requests of the plurality of secondary system apparatuses or is directly obtained from the geographic location database; and wherein the second processor is further configured to calculate, according to the primary system interference reference point information, available spectrum resources for the plurality of secondary system apparatuses utilizing the predetermined spectrum resource calculation manner, and adjust, according to the calculated available spectrum resources and the predetermined performance request, the current grouping of the plurality of secondary system apparatuses.

* * * * *